US012561527B2

(12) United States Patent
Jain et al.

(10) Patent No.: US 12,561,527 B2
(45) Date of Patent: Feb. 24, 2026

(54) APPARATUS AND A METHOD FOR DETECTING ASSOCIATIONS AMONG DATASETS OF DIFFERENT TYPES

(71) Applicant: Pramana Inc., Cambridge, MA (US)

(72) Inventors: Jaya Jain, Bhopal (IN); Prasanth Perugupalli, Cary, NC (US); Rakesh Barve, Bangalore (IN)

(73) Assignee: Pramana, Inc., Cambridge, MA (US)

( * ) Notice: Subject to any disclaimer, the term of this patent is extended or adjusted under 35 U.S.C. 154(b) by 186 days.

(21) Appl. No.: 18/217,378

(22) Filed: Jun. 30, 2023

(65) Prior Publication Data

US 2024/0028831 A1      Jan. 25, 2024

Related U.S. Application Data

(60) Provisional application No. 63/357,978, filed on Jul. 1, 2022.

(51) Int. Cl.
G06F 40/295      (2020.01)
G06F 16/38      (2019.01)
(52) U.S. Cl.
CPC ............ G06F 40/295 (2020.01); G06F 16/38 (2019.01)
(58) Field of Classification Search
CPC ...... G06F 16/00; G06F 16/243; G06F 16/245; G06F 16/2453; G06F 16/24547; G06F 16/2477; G06F 16/285; G06F 16/3338; G06F 16/38; G06F 18/2148; G06F 18/22; G06F 40/289; G06F 40/295; G06F 16/2365; G06F 16/2465; G06F 16/30; G06F 16/31; G06F 16/338; G06F 16/35; G06F 16/40;

(Continued)

(56) References Cited

U.S. PATENT DOCUMENTS 6,629,097 B1 *  9/2003  Keith .................... G06F 16/285
                                                          715/848
7,243,100 B2 *  7/2007  Ma ...................... G06F 16/2465
                                                          707/999.102

(Continued)

OTHER PUBLICATIONS

International Search Report; PCT/US2023/026814; Date: Oct. 3, 2023; By: Authorized Officer Kari Rodriquez.

*Primary Examiner* — Gerald Gauthier
(74) *Attorney, Agent, or Firm* — Caldwell Intellectual Property Law

(57)      ABSTRACT

As apparatus for detecting associations among datasets of different types is disclosed. The apparatus includes at least a processor and a memory communicatively connected to the at least a processor. The memory instructs the processor to receive a plurality of datasets from a user. The memory instructs the processor to identify a first set of associations between the plurality of datasets. The memory instructs the processor to generate a second set of associations as a function of the first set of associations using a second association classifier. Generating a second set of associations includes training the second association classifier using a using second association training data, wherein second association training data comprises a plurality of data entries containing the first set of associations as inputs correlated to the second set of associations as outputs The memory instructs the processor to display the second set of associations using a display device.

18 Claims, 8 Drawing Sheets

(58) Field of Classification Search
CPC ........ G06F 16/48; G06F 16/75; G06F 16/953; G06F 18/2115; G06F 40/40; G06N 3/045; G06N 3/0464; G06N 3/0475; G06N 3/094; G06N 5/048; G06N 7/01; G06N 20/00; G06N 3/09; G06N 5/022; G16H 50/20; G06Q 30/0255; G06Q 30/0629; G06V 10/751
See application file for complete search history.

(56) References Cited

U.S. PATENT DOCUMENTS

| 8,380,583 | B1 * | 2/2013 | Chanda | G06Q 30/0255 |
| | | | | 705/26.7 |
| 8,386,490 | B2 * | 2/2013 | Jiang | G06F 16/48 |
| | | | | 707/739 |
| 8,521,509 | B2 * | 8/2013 | Abir | G06F 16/30 |
| | | | | 704/7 |
| 8,744,835 | B2 * | 6/2014 | Abir | G06F 40/284 |
| | | | | 704/10 |
| 8,949,264 | B2 * | 2/2015 | Cohen | G06F 16/243 |
| | | | | 707/760 |
| 10,983,983 | B2 * | 4/2021 | Kallas | G06F 16/2365 |
| 11,100,408 | B2 * | 8/2021 | Dubey | G06N 20/00 |
| 11,222,027 | B2 * | 1/2022 | Huh | G06F 16/953 |
| 11,593,665 | B2 * | 2/2023 | Pai | G06N 5/022 |
| 12,067,625 | B2 * | 8/2024 | Fani | G06F 16/245 |
| 12,141,528 | B2 * | 11/2024 | O'Hagan | G06F 16/35 |
| 2003/0061025 | A1 * | 3/2003 | Abir | G06F 40/289 |
| | | | | 704/7 |
| 2004/0243554 | A1 * | 12/2004 | Broder | G06F 16/38 |
| 2007/0055691 | A1 * | 3/2007 | Statchuk | G06F 16/31 |
| | | | | 707/999.102 |
| 2008/0004989 | A1 * | 1/2008 | Yi | G06Q 30/0629 |
| | | | | 705/26.1 |
| 2009/0089273 | A1 * | 4/2009 | Hicks | G06F 16/00 |
| | | | | 707/999.005 |
| 2009/0182723 | A1 * | 7/2009 | Shnitko | G06F 16/38 |
| | | | | 707/999.005 |
| 2011/0196895 | A1 * | 8/2011 | Yi | G06Q 30/0601 |
| | | | | 707/723 |
| 2012/0290293 | A1 * | 11/2012 | Hakkani-Tur | G06F 16/3338 |
| | | | | 704/9 |
| 2013/0054597 | A1 * | 2/2013 | Hao | G06F 16/338 |
| | | | | 707/737 |
| 2014/0095150 | A1 * | 4/2014 | Berjikly | G06F 40/40 |
| | | | | 704/9 |
| 2017/0285008 | A1 | 10/2017 | Nolan et al. | |
| 2017/0300534 | A1 * | 10/2017 | Fu | G06F 16/953 |
| 2020/0089793 | A1 * | 3/2020 | Lewis | G06F 16/2453 |
| 2020/0159769 | A1 * | 5/2020 | Chiarandini | G06F 16/75 |
| 2020/0167914 | A1 | 5/2020 | Stamatoyannopoulos et al. | |
| 2020/0372638 | A1 | 11/2020 | Gregson et al. | |
| 2020/0388396 | A1 * | 12/2020 | Lindvall | G16H 50/20 |
| 2021/0042312 | A1 * | 2/2021 | Van Syckel | G06F 16/24547 |
| 2021/0097042 | A1 * | 4/2021 | D'Souza | G06F 16/2477 |
| 2021/0110275 | A1 * | 4/2021 | Chen | G06F 18/22 |
| 2021/0117815 | A1 | 4/2021 | Creed et al. | |
| 2021/0342642 | A1 * | 11/2021 | Shabtay | G06F 18/2148 |
| 2022/0208353 | A1 * | 6/2022 | Neumann | G06N 20/00 |
| 2024/0028831 | A1 * | 1/2024 | Jain | G06F 16/38 |

\* cited by examiner

705

Receiving a Plurality of Datasets from a User

710

Identifying a First Set of Associations between the First Dataset and the Second Dataset

715

Generating a Second Set of Associations as a function of the First Set of Associations using a Second Association Classifier

720

Displaying the Second Set of Associations using a Display Device

700

APPARATUS AND A METHOD FOR DETECTING ASSOCIATIONS AMONG DATASETS OF DIFFERENT TYPES

CROSS-REFERENCE TO RELATED APPLICATIONS

This application claims the benefit of priority to U.S. Provisional Application No. 63/357,978 filed on Jul. 1, 2022 and entitled "SYSTEMS AND METHODS FOR DETECTING ASSOCIATIONS AMONG DATASETS OF DIFFERENT TYPES," the entirety of which is incorporated herein by reference.

FIELD OF THE INVENTION

The present invention generally relates to the field of detecting associations among datasets of different types. In particular, the present invention is directed to an apparatus and a method for detecting associations among datasets of different types.

BACKGROUND

In various fields, such as healthcare, pathology, logistics, and document management, the need for accurate and reliable information extraction and association across multiple mediums is critical. However, current technologies used to create relationships for data across two or more mediums is flawed and can introduce errors due to factors like image quality, font variations, or data inconsistencies.

SUMMARY OF THE DISCLOSURE

In an aspect, an exemplary apparatus for detecting associations among datasets of different types includes at least a processor and a memory communicatively connected to the at least a processor, wherein the memory contains instructions configuring the at least a processor to: receive a plurality of datasets, wherein the plurality of datasets comprises a first dataset and a second dataset, identify a first set of associations between a first subset of the first dataset and a first subset of the second dataset, generate a second set of associations between a second subset of the first dataset and a second subset of the second dataset, as a function of the first set of associations using a second association classifier, wherein generating the second set of associations includes training the second association classifier using second association training data, wherein the second association training data comprises a plurality of data entries containing the first set of associations, and generating the second set of associations as a function of the first set of associations using the trained second association classifier, and display the second set of associations using a display device.

In another aspect, an exemplary method for detecting associations among datasets of different types includes receiving, using at least a processor, a plurality of datasets, wherein the plurality of datasets includes a first dataset and a second dataset, identifying, using the at least a processor, a first set of associations between a first subset of the first dataset and a first subset of the second dataset, generating, using the at least a processor, at a second set of associations between a second subset of the first dataset and a second subset of the second dataset, as a function of the first set of associations using a second association classifier, wherein generating the second set of associations includes training the second association classifier using a using second association training data, wherein the second association training data comprises a plurality of data entries containing the first set of associations and generating the second set of associations as a function of the first set of associations using the trained second association classifier, and displaying the second set of associations using a display device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for detecting associations among datasets of different types is disclosed. The apparatus includes at least a processor and a memory communicatively connected to the at least a processor. The memory instructs the processor to receive a plurality of datasets from a user. The memory instructs the processor to identify a first set of associations between the plurality of datasets. The memory instructs the processor to generate a second set of associations as a function of the first set of associations using a second association classifier. Generating a second set of associations includes training the second association classifier using a using second association training data, wherein second association training data comprises a plurality of data entries containing the first set of associations as inputs correlated to the second set of associations as outputs The memory instructs the processor to display the second set of associations using a display device. Exemplary embodiments illustrating aspects of the present disclosure are described below in the context of several specific examples.

Figure 1:
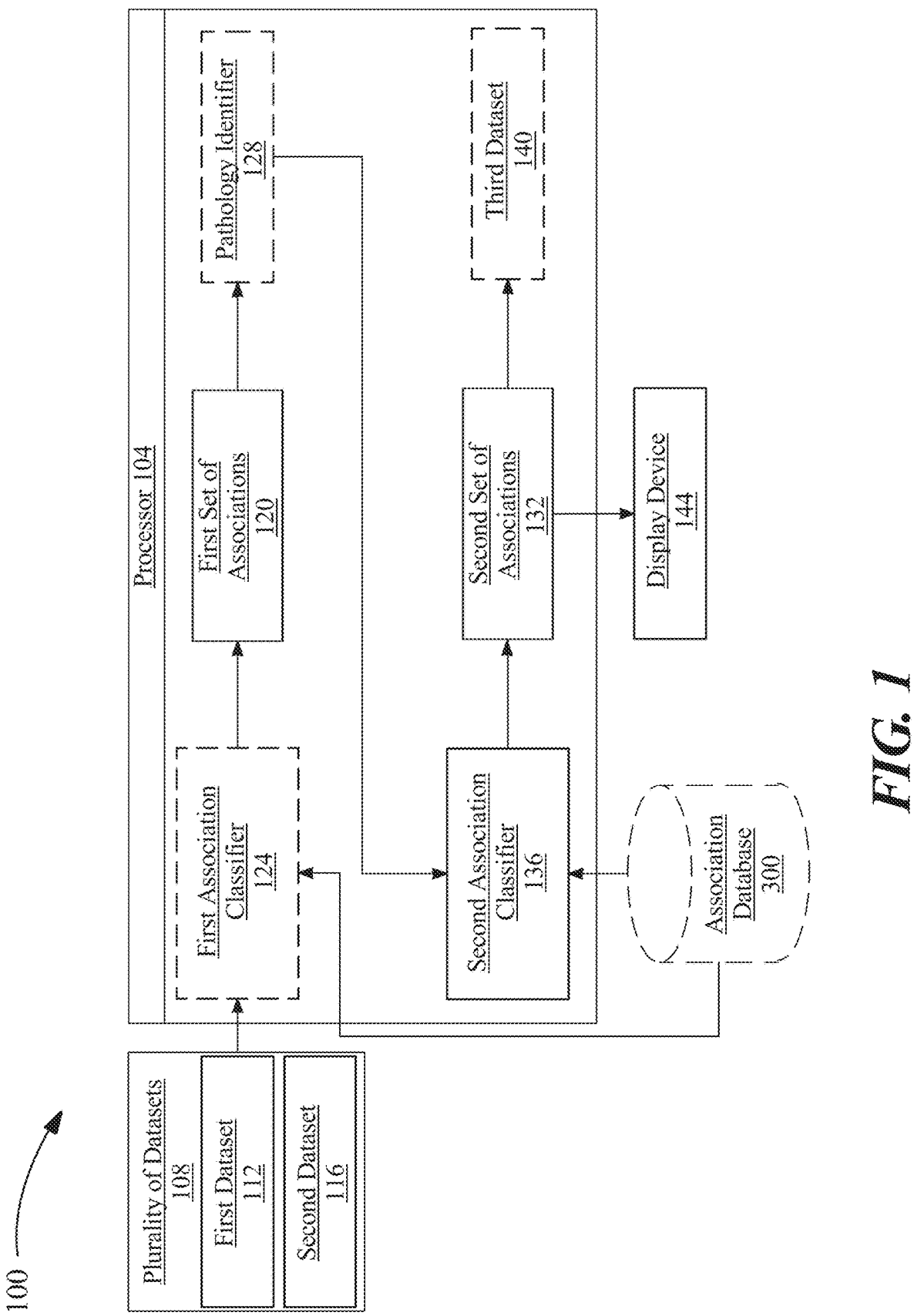
FIG. 1 is a block diagram of an exemplary embodiment of an apparatus for detecting associations among datasets of different types.

Referring now to FIG. 1, an exemplary embodiment of an apparatus 100 for detecting associations among datasets of different types is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. Memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 is configured to receive a plurality of datasets 108 from a user. As used in the current disclosures, a "dataset" is a collection of data. A dataset 108 is a structured collection of data that is organized and presented in a specific format for analysis and interpretation. It consists of individual data points or observations, each representing a specific piece of information. A dataset 108 can be generated through various means, including manual data entry, data collection from sensors or instruments, scraping data from websites, or extracting data from existing databases. A dataset may include a plurality of individual data points, often referred to as records, instances, or observations. Each data point represents a distinct unit of information, such as a customer, a transaction, a measurement, or any other relevant entity.

With continued reference to FIG. 1, plurality of datasets 108 may include a plurality of metadata. As used in the current disclosure, "metadata" refers to descriptive information or attributes that provide context, structure, and meaning to data. Metadata is essentially data about data. Metadata helps in understanding and managing various aspects of data, such as its origin, content, format, quality, and usage. It plays a crucial role in organizing, searching, and interpreting data effectively. Metadata may include descriptive metadata, structural metadata, administrative metadata, technical metadata, provenance metadata, usage metadata, and the like. Metadata may be organized and managed through metadata schemas, standards, or frameworks. These provide guidelines and specifications for capturing, storing, and exchanging metadata in a consistent and structured manner. Common metadata standards include Dublin Core, Metadata Object Description Schema (MODS), and the Federal Geographic Data Committee (FGDC) metadata standard. In some cases, metadata may be associated with textual data or image data. Metadata may also be associated with a pathology slide. Metadata may provide additional descriptive information or attributes that are linked to the image data or textual data associated with the pathology slide. Metadata associated with the plurality of datasets 108 may include patient information. Patient information may include data such as the patient's name, unique patient identifier (ID), age, gender, and any other relevant demographic information. Patient information helps in identifying and associating the slide with the correct individual's medical records. Metadata may also include case specific details, wherein case specific details may include information about the specific case or clinical scenario related to the slide. Case specific details may include information about the case number, referring physician, clinical history, relevant symptoms, or any other pertinent details that aid in understanding the context of the slide. In some cases, metadata may include information related to the specific specimen type of the slide. This may include the type of tissue or sample that the slide represents. Metadata may contain notes, comments, or observations made by the pathologist or other medical professional. These annotations might highlight specific features, anomalies, or noteworthy aspects of the slide that are important for interpretation or follow-up analysis. The date and time when the slide was prepared, analyzed, or labeled can be associated as metadata. This information helps in tracking and maintaining a chronological record of slide-related activities. It could be breast tissue, lung biopsy, skin lesion, or any other anatomical or pathological specimen. In some embodiments, metadata may contain information regarding staining or preparation technique, pathological diagnosis, and the like.

With continued reference to FIG. 1, a plurality of datasets 108 includes a first data set 112. As used in the current disclosure, a "first data set" is a data set 108 that includes a plurality of data. In an embodiment, a first data set 112 may be a dataset 108 that comprises a plurality textual data. As used in the current disclosure, "textual data" is a collection of data that consists of text-based information. Examples of textual data may include documents, captions, sentences, paragraphs, free-text fields, transcriptions, prognostic labels, and the like. In some embodiments, textual data within a first data set may be related to a pathology slide. As used in the current disclosure, a "pathology slide" is a glass slide containing a portion of biopsied biological material from a patient. A pathology slide may include biopsied tissue from a patient, wherein the biopsied tissue is sliced into very thin layers and placed on a glass slide. A first data set 112 may include a written description of various aspects of the pathology slide. A first data set 112 may include documents surrounding the pathology slide. These documents may include information regarding testing, analysis, storage, and disposal of pathology slides by medical professionals. The first data set 112 may include information that describes and provides context for the pathology slide, enabling researchers, clinicians, or data analysts to understand and analyze the slide effectively. In a non-limiting example, the first data set 112 may include a slide identifier, slide description, clinical information, pathology reports, annotations, notes, research findings, and the like. A first data set 112 may include a brief description or summary of the pathology slide, providing an overview of its content, specimen type, and relevant characteristics. This description can include details such as tissue type, staining techniques used, and any specific features or abnormalities present in the slide. In other embodiments, the first data set 112 may include a pathology report generated by a medical professional or data scientist after analyzing the slide. This report may provide detailed findings, observations, interpretations, and diagnoses based on the examination of the slide. It may include descriptions of tissue structures, cell morphology, tumor grading, staging, and other relevant pathological features.

With continued reference to FIG. 1, a plurality of datasets 108 includes a second data set 116. As used in the current disclosure, a "second data set" is a data set 108 that includes a plurality of data. In an embodiment, a second data set 116 may be a dataset 108 that comprises a plurality image data. As used in the current disclosure, "image data" is a collection of data that consists of data associated with a plurality of images. A second dataset 116 may be collection of multiple images organized and presented in a specific format for analysis, training machine learning models, or any other image-related tasks. It may consist of a diverse range of images captured from various sources, such as digital cameras, satellites, medical imaging devices, microscopes, or other image acquisition methods. The image data may be stored in a digital format, such as JPEG, PNG, or TIFF. Image data may include both color images and/or grayscale images. The second data set 116 may include a plurality of medical images. Medical images may include X-rays, CT scans, MRI, Ultrasound, PET scans, Electrocardiogram scans, and the like. In some cases, image data may include either 2D and/or 3D medical images. In an embodiment, a second data set 116 may include a plurality of images associated with a pathology slide. Image data associated with a pathology slide may include a visual representation of the slide captured through imaging techniques. The image data may represent cellular structures, tissue morphology, and any pathological features observed on the slide. This may include a series of images that capture the pathology slides. In an embodiment, this may include a plurality of images of pathology slides under various levels of magnification and at various resolutions. Image data associated with a pathology slide may be captured at various magnification levels, ranging from low to high power. Lower magnification images may provide a broader view of the tissue and help identify the general structure, while higher magnification images may offer a more detailed examination of individual cells and cellular structures. Image data may include images obtained through digital scanning or digital microscopy techniques. In some cases, each image may represent a specific pathology slide and contains visual information about the cellular structures, tissue morphology, and any abnormalities or features present in the slide. The second data set 116 may also contain metadata that provides additional information about each pathology slide image. This metadata can include details such as slide specimen type (e.g., tissue, cells, biopsies), staining techniques used, magnification level, imaging modality, and any relevant contextual information about the slide. In some embodiments, In some cases, image data may include annotations or overlays that highlight specific regions or features of interest. These annotations can be manually added by pathologists or generated by automated algorithms to assist in identifying and analyzing specific pathological findings.

With continued reference to FIG. 1, a plurality of datasets 108 may include a plurality of media data. As used in the current disclosure, "media data" is an element of data associated with a plurality of media. Media may include audio recordings, video recordings, images, digital media, graphs, interrelated data structures, and the like. In some embodiments, media data may include video data. Video data may capture a sequence of frames, often showing temporal changes or dynamic processes. Video data may be utilized in applications such as surveillance, action recognition, and motion analysis. Each video within the dataset may contain multiple frames, and associated metadata can provide details such as duration, frame rate, or timestamps. In some cases, media data may include audio data. Audio data may include audio files are another type of media data found in datasets. They can include recorded sounds, speech, or sounds associated with a pathology slide. Audio data is frequently used in speech recognition, audio classification, and acoustic analysis. Metadata for audio data can include attributes like duration, sample rate, or audio format. In some cases, media data may include document data. Document data may include textual documents, such as PDFs, Word files, or plain text files. These documents can contain research papers, reports, or any other form of written information. Document data is often used in natural language processing tasks, information retrieval, or text classification. Metadata for document data can include information like document title, author, publication date, or word count. In some cases, media data may be associated with a pathology slide. Media data associated with a pathology slide may refer to additional information and records related to the slide, such as images, videos, or metadata. These media elements serve to supplement the slide itself and provide further insights into the underlying pathology.

With continued reference to FIG. 1, media data may include graphs or other interrelated data structures. In some cases, the content of the graphs and data structures may be associated with a pathology slide. Media data may include a tissue graph, where individual cells or regions within the tissue are represented as nodes, and connections or edges between them denote spatial relationships or interactions. This graph structure allows for the exploration of cellular networks, patterns of cell organization, and identification of abnormal cell clusters. Additionally, media data may include a diagnostic pathway graph, which maps the progression of diagnoses based on observations and test results. It represents the decision-making process followed by pathologists, indicating the potential branching paths and alternative diagnoses. Data structures, such as databases or file systems, are employed to store and manage various data associated with the pathology slide. These structures may include patient information, slide metadata, diagnostic annotations, digital images, and other media data. They facilitate efficient retrieval, organization, and retrieval of relevant information for clinical purposes, research, and education.

With continued reference to FIG. 1, processor 104 is configured to identify a first set of associations 120 between the first dataset 112 and the second dataset 116. As used in the current disclosure, "first set of associations" refers to the relationship or connection established between two or more data types. This may include a relationship or connection established between image data and textual data. It involves linking or integrating the image data of the second dataset 116 with descriptive or explanatory textual data of the first dataset 112 to provide additional context, enhance understanding, and convey relevant information. In an embodiment, a first set of associations 120 may include an identification of an object or a set of objects within the image data of the second dataset 116 and identifying that object using textual data of the first dataset 116. A non-limiting example, processor 104 may identify an group of abnormal objects within a plurality of image data associated with the second dataset 116. Processor 104 may identify the objects based on an combination of the metadata and the image data from the second dataset 116, wherein the metadata identifies the biopsied tissue from the slide and the image data includes an image of the abnormality. Processor 104 may then pair the abnormality to the textual data of the first dataset 112, wherein the textual data comprises a written description of the abnormality. The pairing of the textural data of the first data set 112 to the image data of the second dataset 116 may be described as the first set of associations 120. In an embodiment, each association of first set of associations 120 may include a feature within the image data of the second dataset 116 correlated to a string of text from the first dataset 112, wherein the string of text may describe the feature linguistically. In a non-limiting example, a first seat of associations may include relationship or connection established between several different data types. This may include a relationship between two or more of audio data, image data, textual data, video data, graphs, data structures, and like.

With continued reference to FIG. 1, processor 104 may be configured to generate a first set of associations 120 using a bootstrap process. As used in the current disclosure, a "bootstrap process" is a resampling technique used to estimate the sampling distribution of a statistic or to assess the uncertainty associated with a sample. The bootstrap process may involve generating multiple resamples of the original dataset by randomly sampling with replacement. Each resample is the same size as the original dataset, but some observations may appear multiple times, while others may be left out. This process allows for the creation of a pseudo-population from which statistical estimates can be derived. Once the resamples are obtained, the desired statistic is computed for each resample. This statistic can be a mean, median, standard deviation, correlation coefficient, or any other relevant measure. By repeating this resampling process numerous times (often several thousand), a distribution of the statistic is obtained, known as the bootstrap distribution. In the current case, processor 104 bootstrap process may begin by generating multiple resamples of the dataset. For example, each resample may consist of paired samples of textual data and image data, any other data mentioned herein. These resamples are created by randomly selecting instances from the first and second dataset with replacement, ensuring that both textual and image data are kept together in each resample. For each resample, the textual and image data pairs are analyzed together to explore the relationship or association between them. Various techniques can be applied based on the specific task or objective. The strength of the relationship or association between textual and image data can be assessed by measuring performance metrics or statistical measures. For classification tasks, accuracy, precision, recall, or F1-score can be computed. Alternatively, correlation coefficients, mutual information, or other statistical measures can be used to quantify the association between the two data types. IF the strength of the relationship or association between textual and image data is above a pre-determined threshold then a first association is created between the textual data and the image data. The bootstrap process may be repeated multiple times, generating different resamples each time. This repetition allows for the estimation of the variability and uncertainty in the relationship or association metrics. By analyzing the results across the resampled datasets, confidence intervals can be constructed, hypothesis tests can be performed, or stability assessments can be made to evaluate the significance and robustness of the relationship.

With continued reference to FIG. 1, a first set of associations 120 may include one or more direct correlations between the first dataset 112 and the second dataset 116. As used in the current disclosure, a "direct correlation" is a direct correspondence or alignment between two or more data types. This may include a direct correspondence or alignment between the visual content of the image data and the accompanying textual data. A direct correlation between the first dataset 112 and the second dataset 116 may involve a clear and explicit correspondence between the image data and the accompanying textual data. In a non-limiting example, a direct connection may involve pairing an image with a caption that accurately describes the objects, scenes, or visual features depicted in the image. The textual data is directly related and closely aligned with the visual information in the image. In the context of pathology slides, this connection aims to provide a comprehensive description of the visual pathology features observed in the second dataset 116 through the associated textual data of the first data set. A non-limiting example of a direct correlation may include annotation of the pathology slide. The image data of the second dataset 116 may be annotated with textual data from the first dataset 112 that explicitly describes the observed features, structures, or abnormalities within the image. The annotations may serve as a direct link between the image data and the associated textual data, providing specific descriptions aligned with the visual content. A direct correlation may include pairing a prognostic label to all or a portion of an image. The prognostic label may describe abnormalities, inflammation, coloration, size, tissue structure, and the like. A prognostic label serves as a direct representation of the visual findings in the image data.

With continued reference to FIG. 1, processor 104 may generate a first set of associations 120 by extracting a visual feature from the second dataset 116. Processor 104 may extract visual features from the image data using machine vision. As used in the current disclosure, "visual features" are one or more objects of interest located within the image data. A visual feature in an image data may include the presence or absence of cellular structures or tissue morphology. The second dataset 116 may contain microscopic images of tissue samples, and visual features can include various elements that provide information about the cellular composition and organization. A non-limiting example of visual features may include cells nuclei, tissue architecture, cellular arrangement, cellular differentiation, inflammatory cells, cellular abnormalities, staining pattern, and the like. In some cases, the morphology and characteristics of cell's nuclei can serve as visual features. This may include the size, shape, chromatin patterns, presence of nucleoli, and any abnormalities such as nuclear enlargement or irregularities. In other cases, the arrangement and organization of tissue components may be identified as visual features. This may include the presence of glands, tubules, ducts, blood vessels, or other anatomical structures within the tissue sample. The spatial distribution and relationships between cells may also be identified as a visual feature. The spatial distribution and relationships may be indicative of specific pathological conditions. Features like cellular crowding, overlapping, irregular patterns, or loss of normal tissue architecture can be observed and analyzed. The degree of cellular differentiation or maturation may be a visual feature that pathologists assess. This may involve evaluating the resemblance of cells to their normal counterparts and identifying any abnormal or undifferentiated cells. The presence and distribution of inflammatory cells, such as lymphocytes, neutrophils, or macrophages, within the tissue sample can be a visual feature indicating an immune response or inflammation. Visual features may include the presence of abnormal cells, such as cancer cells or cells with abnormal shapes, sizes, or staining patterns. These abnormalities can be indicative of neoplastic conditions or other pathological processes. Different staining techniques are used in pathology to highlight specific components or structures. The staining patterns, such as eosinophilia, basophilia, or immunohistochemical staining, can serve as visual features to identify certain cellular characteristics or pathological markers.

With continued reference to FIG. 1, processor 104 may identify visual features within the second data set 116 using a machine vision system. A machine vision system may identify distinctive points or regions in the image that can be used as a visual feature features. A machine vision system may use images from the second data set 116, to make a determination about a scene, space, and/or object within the image data. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

With continued reference to FIG. 1, processor 104 may match the extracted a visual feature from the second dataset 116 to similar visual features. Feature matching involves comparing visual features extracted from different image data to identify corresponding or similar features. It aims to establish correspondences between the features in different image data, which can be useful for tasks such as image alignment, object recognition, or image retrieval. Processor 104 may generate a description of the extracted visual feature once it is identified. The description may capture the local appearance or characteristics around each visual feature. The description may include what type of tissue is located within the slide, a description of any visual features, and the like. The description may include information regarding the shape, texture, color, inflammation, staining pattern, or gradient of the region surrounding the visual feature. Processor 104 may pair the description of the extracted visual feature to the description of other visual features that have been previously identified. In some cases, processor 104 may compare the measure of similarity or correspondence between visual features in different pathology slides. This information can be used to quantify the similarity or dissimilarity between slides based on shared or distinct visual features. It enables comparing slides based on common morphological patterns, cellular characteristics, or other visual attributes. In some embodiments, visual feature pairing may be employed to find similar or corresponding regions of interest (ROIs) in different pathology slides. For example, in tumor detection or tracking, matching features in different slides can identify the same tumor region over time or across different patient samples.

With continued reference to FIG. 1, processor 104 may be configured to generate a plurality of named entities as a function of the first dataset 112 using a named entity recognition process. As used in the current disclosure, a "named entity" is a specific type of word or phrase that represents a real-world object with a unique identity. Named entities may be people, places, ideas, concepts, or things that denote specific individuals, organizations, locations, dates, times, products, events, quantities, diseases, tissue samples, and other entities that can be uniquely identified. These entities play a significant role in understanding the context and extracting meaningful information from text. Named entities may provide contextual information and serve as reference points for understanding the meaning and relationships within a text. Recognizing and extracting named entities from textual data is a fundamental task in natural language processing (NLP), information extraction, text mining, and various other applications where understanding the semantics and identifying key elements of text is important. Named entities generated from textual data associated with the first dataset 112 can include specific terms or entities that provide information about the slide, its characteristics, or the observed pathological findings. Non-limiting examples of named entities may include disease, condition names, tissue or organ names, cell types, cell structures, staining methods, staining techniques, gene names, protein names, diagnostic terminologies, medical abbreviations, and the like.

With continued reference to FIG. 1, processor 104 may be configured to generate a plurality of named entities using a named entity recognition (NER) system. As used in the current disclosure, a "named entity recognition (NER) system" is software that identifies a plurality of named entities in from text. A NER system may be configured to identify a plurality of named entities from a first dataset 112. Inputs of a NER system may include a plurality of datasets 108, first dataset 112, metadata, textual data, and the like. The output of a named entity recognition system may include a plurality of named entities. Named entities may include a structured representation of the identified named entities, typically in the form of annotations or tags attached to the original text.

With continued reference to FIG. 1, a NER system may generate a plurality of named entities using a natural language processing model. As used in the current disclosure, a "natural language processing (NLP) model" is a computational model designed to process and understand human language. It leverages techniques from machine learning, linguistics, and computer science to enable computers to comprehend, interpret, and generate natural language text. The NLP model may preprocess the textual data, wherein the input text may include the first dataset 112, or any other data mentioned herein. Preprocessing the input text may involve tasks like tokenization (splitting text into individual words or sub-word units), normalizing the text (lowercasing, removing punctuation, etc.), and encoding the text into a numerical representation suitable for the model. The NLP model may include transformer architecture, wherein the transformers are deep learning models that employ attention mechanisms to capture the relationships between words or sub-word units in a text sequence. They consist of multiple layers of self-attention and feed-forward neural networks. The NLP model may weigh the importance of different words or sub-word units within a text sequence while considering the context. It enables the model to capture dependencies and relationships between words, considering both local and global contexts. This process may be used to identify a plurality of named entities. Language processing model may include a program automatically generated by processor 104 and/or named entity recognition system to produce associations between one or more significant terms extracted from a first dataset 112 and detect associations, including without limitation mathematical associations, between such significant terms. Associations between language elements, where language elements include for purposes herein extracted significant terms, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted significant term indicates a given category of semantic meaning. As a further example, statistical correlations and/or mathematical associations may include probabilistic formulas or relationships indicating a positive and/or negative association between at least an extracted significant term and/or a given semantic relationship; positive or negative indication may include an indication that a given document is or is not indicating a category semantic relationship. Whether a phrase, sentence, word, or other textual element in first dataset 112 constitutes a positive or negative indicator may be determined, in an embodiment, by mathematical associations between detected significant terms, comparisons to phrases and/or words indicating positive and/or negative indicators that are stored in memory at processor 104, or the like.

With continued reference to FIG. 1, processor 104 may generate the first set of associations 120 by pairing the one or more visual features to the plurality of named entities. In some cases a first set of associations 120 may include joint representation of the named entities and the plurality of visual features. The visual features of the second dataset 116 and the named entities of the first dataset 112 may be combined to create a joint representation of the prognostic slide. In some cases, the joint representation may be used as training data for a machine learning model as mentioned herein below. In some cases, the pairing of the one or more visual features to the plurality of named entities may include annotations overlaid on the image serve as a direct correlation between the visual and textual data. These annotations may highlight specific regions or structures of interest within the pathology slide, and the corresponding text provides a detailed description or diagnosis associated with those regions. Annotations can indicate the presence of tumors, grading or staging information, or any specific abnormalities observed. In other cases, the pairing of the one or more visual features to the plurality of named entities may include a pathology report that directly describes the visual features observed in the image. The report may provide detailed findings, interpretations, and diagnoses based on the examination of the pathology slide. It aligns directly with the visual information, describing tissue structures, cell morphology, tumor characteristics, and any other relevant pathological observations.

With continued reference to FIG. 1, processor 104 may generate a first set of associations 120 using a first association classifier 124. As used in the current disclosure, a "first association classifier" is a classifier that is configured to generate a first set of associations 120. The first association classifier 124 may be consistent with the classifier described below in FIG. 2. Inputs to the first association classifier 124 may include plurality of datasets 108, first dataset 112, second dataset 116, examples of a first set of associations 120, and the like. Outputs to the first association classifier 124 may include a first set of associations 120 tailored to the first dataset 112 and second dataset 116. First association training data may include a plurality of data entries containing a plurality of inputs that are correlated to a plurality of outputs for training a processor by a machine-learning process. In an embodiment, first association training data may include a plurality of first datasets 112 and a plurality of second datasets 116 correlated to examples of a first set of associations 120. In another embodiment, first association training data may include a plurality of named entities correlated to a plurality of visual features. First association training data may be received from database 300. First association training data may contain information about plurality of datasets 108, first dataset 112, second dataset 116, examples of a first set of associations 120, and the like. In an embodiment, first association training data may be iteratively updated as a function of the input and output results of past first association classifier or any other classifier mentioned throughout this disclosure. The classifier may use, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifier, and the like.

With continued reference to FIG. 1, processor 104 may assign each visual feature or named entity a pathology identifier 128. As used in the current disclosure, a "pathology identifier" is a unique identification code or label that is assigned to both image data and textual data associated with a pathology slide. This identifier serves as a common reference or link between the image data and the corresponding textual information, enabling their association and retrieval. The pathology identifier 128 may represent the content of both image data and textual data. In a non-limiting example, a pathology identifier 128 may identify both images and text that contain information regarding a the structure of the tissue within the pathology slide. The pathology identifier 128 may be a numerical code, alphanumeric code, barcode, QR code, and the like. By using the same identifier for both modalities, a direct association or indirect association is established, ensuring that the image data and textual data represent the same pathology slide. In some cases, the pathology identifier 128 may be used to represent a first set of associations 120 or a second set of associations. The pathology identifier 128 may be assigned to the first set of associations 120 or the second set of associations 132 using processor 104. This identifier acts as a common reference point to establish a connection between the visual content captured in the image data and the corresponding textual information, such as pathology reports or clinical notes and the images associated with the pathology slide. This identifier facilitates the seamless integration and retrieval of the information, enabling efficient organization, analysis, and retrieval of pathology data. Researchers, pathologists, and healthcare professionals can use the pathology identifier 128 to retrieve and access the image data and textual data together, allowing for a comprehensive understanding of the pathology slide's content and facilitating accurate diagnosis, research, and collaboration.

With continued reference to FIG. 1, processor 104 is configured to identify a second set of associations 132 between the first dataset 112 and the second dataset 116 as a function of the first set of associations 120. As used in the current disclosure, "second set of associations" refers to the relationship or connection established two or more types of data. This may include a relationship or connection established between image data and textual data. A second set of association 128 may be generated in a similar manner as the first set of associations. A second set of associations 132 may involve linking or integrating the image data of the second dataset 116 with descriptive or explanatory textual data of the first dataset 112 to provide additional context, enhance understanding, and convey relevant information. The second set of associations 132 may be similar to the first set of associations 120. However, the second set of associations 132 may contain a plurality of indirect correlations between the first dataset 112 and the second dataset 116. As used in the current disclosure, an "indirect correlation" refers to a relationship where the first dataset 112 provides textual data related or complementary information to the image data of the second dataset 112, but does not explicitly describe the visual features observed in the image. An indirect correlation may provide contextual information that is related to the image content. This may include patient demographics, medical history, presenting symptoms, diagnosis, treatment details, or other relevant clinical information associated with the pathology slide. While not describing the visual appearance directly, this information helps provide context and insights into the underlying pathology. In an embodiment, indirect correlations may include diagnostic findings or interpretations made by pathologists or healthcare professionals based on their examination of the pathology slide. The findings may not explicitly describe the visual appearance, they provide insights into the presence of abnormalities, disease conditions, tumor grading or staging, or other diagnostic observations related to the image data. The indirect correlations between the first dataset 112 and the second dataset 116 may allow for a broader understanding of the clinical context, patient history, and diagnostic interpretations associated with the visual information captured in the image. While the textual data may not explicitly describe the visual features, it provides complementary information that enhances the interpretation and analysis of the pathology slide.

With continued reference to FIG. 1, processor 104 is configured to identify a second set of associations 132 between the first dataset 112 and the second dataset 116 as a function of the first set of associations 120. Processor 104 may generate a second set of associations 132 a function of a plurality of pathology identifiers 128. In an embodiment, processor 104 pair data in the first dataset 112 and the second dataset 116 based on their degree of similarity according to the pathology identifiers 128. Processor 104 may generate similarity scores between the query image features and the features of other textual descriptions in the dataset, and vice versa. This allows the processor 104 to identify the most similar and relevant image-text pairs. In some embodiments, a processor may engage in an image to text similarity calculation or a text to image similarity calculation. These calculations may be used to evaluate how similar the content of the images data and the content textual data. As used in the current disclosure, a "similarity score" is score that reflects the degree of similarity between the content of image data and textual data. A similarity score may be generated by preprocessing the both the image data and the textual data. Preprocessing may include resizing, normalizing, and extracting relevant visual features using computer vision techniques like convolutional neural networks (CNNs). Alternatively, preprocessing the textual data may be done by tokenizing, removing stop words, and transforming it into a numerical representation using techniques such as word embeddings or language models. Processor 104 may then associate each visual feature and named entity with a unique pathology identifier 128. This identifier serves as a link between the image and textual data associated with the same pathology slide. The processor 104 then generate similarity scores between the visual features of the second data set 116 and the textual features of the first data set 112. Various similarity metrics can be used, such as cosine similarity, Euclidean distance, or other distance measures that capture the similarity between feature vectors. Processor 104 may then sort the pairs of visual features and named entities based on their similarity scores in descending order. This will identify the most similar image-text pairs. The processor 104 may additionally filter the associations by considering only those pairs that share the same pathology identifier. This ensures that the generated associations are based on the content similarity of image and textual data associated with the same pathology slide.

With continued reference to FIG. 1, processor 104 may generate a second set of associations 132 using a second association classifier 136. As used in the current disclosure, a "second association classifier" is a classifier that is configured to generate a second set of associations 132. The second association classifier 136 may be consistent with the classifier described below in FIG. 2. Inputs to the second association classifier 136 may include plurality of datasets 108, first dataset 112, second dataset 116, a first set of associations 120, visual features, named entities, pathology identifiers, examples of a second set of associations 132, and the like. Outputs to the second association classifier 136 may include a second set of associations 136 tailored to the first dataset 112 and second dataset 116. Outputs to the second association classifier 136 may additionally include a similarity score. Second association training data may include a plurality of data entries containing a plurality of inputs that are correlated to a plurality of outputs for training a processor by a machine-learning process. In an embodiment, second association training data may include a first set of associations 120 correlated to examples of a second set of associations 136. In another embodiment, second association training data may include a plurality of named entities correlated a plurality of visual features. Second association training data may be received from database 300. Second association training data may contain information about plurality of datasets 108, first dataset 112, second dataset 116, a first set of associations 120, visual features, named entities, pathology identifiers, examples of a second set of associations 132 and the like. In an embodiment, second association training data may be iteratively updated as a function of the input and output results of past first association classifier or any other classifier mentioned throughout this disclosure. The classifier may use, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifier, and the like.

With continued reference to FIG. 1, processor 104 may generate the second set of associations 132 using a comparison fuzzy inference. As used in the current disclosure, a "comparison fuzzy inference" is a method that interprets the values in the input vector (i.e., visual features and named entities.) and, based on a set of rules, assigns values to the output vector. A set of fuzzy rules may include a collection of linguistic variables that describe how the system should make a decision regarding classifying an input or controlling an output. Fuzzy inference rules operate on fuzzy sets and provide a framework for mapping input variables to output variables through linguistic rules. Fuzzy inference rules may operate using linguistic variables, which represent imprecise or vague concepts rather than precise numerical values. Linguistic variables are defined by membership functions, which describe the degree of membership or truth for different linguistic terms or categories. In a non-limiting example, a linguistic variable associated with the second set of associations 132 may have linguistic terms like "Highly Related," "Moderately Related," and/or "Unrelated" each with its corresponding membership function. A fuzzy inference rule typically follows a conditional "IF-THEN" structure. It consists of an antecedent (IF part) and a consequent (THEN part). The antecedent specifies the conditions or criteria based on which the rule will be applied, and the consequent determines the output or conclusion of the rule. In an embodiment. the second set of associations 132 may be determined by a comparison of the degree of match between a first fuzzy set and a second fuzzy set, and/or single values therein with each other or with either set, which is sufficient for purposes of the matching process.

Still referring to FIG. 1, second set of associations 132 may be determined as a function of the intersection between two fuzzy sets, wherein each fuzzy set may be representative of a visual features and a named entities respectively. Comparing the visual features and a named entities may include utilizing a fuzzy set inference system as described herein below, or any scoring methods as described throughout this disclosure. For example, without limitation, processor 104 may use a fuzzy logic model to determine a first set of associations 120 or a second set of associations 136 as a function of fuzzy set comparison techniques as described in this disclosure. In some embodiments, each piece of information associated with a visual features may be compared to a named entities, wherein the second set of associations 132 may be represented using a linguistic variable on a range of potential numerical values, where values for the linguistic variable may be represented as fuzzy sets on that range; a "good" or "ideal" fuzzy set may correspond to a range of values that can be characterized as ideal, while other fuzzy sets may correspond to ranges that can be characterized as mediocre, bad, or other less-than-ideal ranges and/or values. In embodiments, these variables may be used to compare a visual features and a named entities to determine the second set of associations 132 specific to the visual features. A fuzzy inferencing system may combine such linguistic variable values according to one or more fuzzy inferencing rules, including any type of fuzzy inferencing system and/or rules as described in this disclosure, to determine a degree of membership in one or more output linguistic variables having values representing ideal overall performance, mediocre or middling overall performance, and/or low or poor overall performance; such mappings may, in turn, be "defuzzified" as described in further detail below to provide an overall output and/or assessment.

Still referring to FIG. 1, the processor may be configured to generate a machine-learning model, such as second association classifier 136, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) \ P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. processor 104 may then calculate a likelihood table by calculating probabilities of different data entries and classification labels. processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a machine-learning model, such as second association classifier 136, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm $l=\sqrt{\sum_{i=0}^{n} a_i^2}$, where $a_i$ is attribute number experience of the vector. Scaling and/or normalization may function to make vector comparison independent of absolute quantities of attributes, while preserving any dependency on the similarity of attributes; this may, for instance, be advantageous where cases represented in training data are represented by different quantities of samples, which may result in proportionally equivalent vectors with divergent values.

With continued reference to FIG. 1, processor 104 may be configured to generate a third dataset 140 using the second set of associations 132. As used in the current disclosure, a "third dataset" is a dataset 108 that includes a plurality of textual data and/or a plurality of image data. A third dataset 140 be generated based on the second set of associations 132. In an embodiment, textual data and/or image data along with the second set of associations 132 may be used to identify additional textual data or image data with an indirect correlation or direct correlation to the initial textual data and/or image data. The additional textual data and/or image data may be identified from the first dataset 112, the second dataset 116, or database 300. Processor 104 may identify a third data set using a cross-modal retrieval process. As used in the current disclosure, a "cross-modal retrieval process" refers to the process of retrieving data from one modality (such as images) based on a query from another modality (such as text) or vice versa. A cross-modal retrieval process involves finding relevant instances in one modality that are semantically related to a query in a different modality. A cross modality retrieval process may be done as a function of the pathology identifier 128. Processor 104 may assign a pathology identifier 128 to the initial textual data and/or image data. The pathology identifier 128 associated with the initial textual data and/or image data may be classified to other related pathology identifiers 128 to identify the image data and/or textual data of the third dataset 140. In a non-limiting example, a processor 104 may receive image data depicting inflamed tissue along with the second set of associations 132. The processor uses a cross-modal retrieval process to generate a third dataset 140 that contains a plurality of textual data that is indirectly correlated to the image data.

With continued reference to FIG. 1, processor 104 may generate a third dataset 140 using a dataset classifier. As used in the current disclosure, a "dataset classifier" is a classifier that is configured to generate a third dataset 140. The dataset classifier may be consistent with the classifier described below in FIG. 2. Inputs to the dataset classifier may include plurality of datasets 108, first dataset 112, second dataset 116, a first set of associations 120, visual features, named entities, pathology identifiers, a second set of associations 132, examples of a third dataset 140, and the like. Outputs to the dataset classifier may include a third dataset 140 which includes textual data and/or image data. Dataset training data may include a plurality of data entries containing a plurality of inputs that are correlated to a plurality of outputs for training a processor by a machine-learning process. In an embodiment, dataset training data may include a second set of associations 136 correlated to examples of a third dataset 140. In another embodiment, dataset training data may include a plurality of named entities correlated a plurality of visual features. Dataset training data may be received from database 300. Dataset training data may contain information about plurality of datasets 108, first dataset 112, second dataset 116, a first set of associations 120, visual features, named entities, pathology identifiers, a second set of associations 132, examples of a third dataset 140, and the like. In an embodiment, dataset training data may be iteratively updated as a function of the input and output results of past first association classifier or any other classifier mentioned throughout this disclosure. The classifier may use, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifier, and the like.

Still referring to FIG. 1, processor 104 may be configured to display second set of associations 132 using a display device 144. As used in the current disclosure, a "display device" is a device that is used to display content. A display device 144 may include a user interface. A "user interface," as used herein, is a means by which a user and a computer system interact; for example, through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

With continued reference to FIG. 1, apparatus 100 for detecting associations among datasets of different types may include at least a processor 104 and a memory communicatively connected to the at least a processor. Memory may contain instructions configuring processor 104 to receive a plurality of datasets 108. Plurality of datasets 108 may include a first dataset 112 and a second dataset 116. Instructions may instruct processor to identify a first set of associations 120 between a first subset of first dataset 112 and a first subset of second dataset 116. In some cases, generating first set of associations includes identifying a plurality of named entities in first dataset 112, wherein each named entity of plurality of named entities is associated with at least a data element in second dataset 116. For instance, first set of associations may be made through explicit naming of constituent data within one or more of first dataset 112 and second dataset 116. Alternatively or additionally, first set of associations may be received from an expert or user input.

With continued reference to FIG. 1, instructions may additionally instruct processor 104 to generate a second set of associations 132 between a second subset of first dataset 112 and a second subset of second dataset 116. In some cases, one or more of second subset of first dataset 112 and second subset of second dataset 116 is greater (e.g., has more data or data elements) than one or more of first subset of the first dataset 112 and first subset of the second dataset 116. Likewise, in some cases, second subset may include some or all of first subset of first dataset 112 and/or second dataset. In some cases, generation of second set of associations 132 may be performed as a function of first set of associations 120, for instance by using a second association classifier 136. In some cases, generating second set of associations 132 may include training second association classifier 136 using second association training data 300. Second association classifier 136 may include any classifier described in this disclosure, for example with reference to FIG. 2. Second association training data may include any training data described in this disclosure, for example with reference to FIG. 2. In some versions, second association training data may include a plurality of data entries containing first set of associations 120. In some cases, generating second set of associations 132 may be performed as a function of first set of associations using trained second association classifier 136. Finally, instructions may instruct processor 104 to display second set of associations using a display device. In some cases, displaying second set of associations may include display of only a portion of second set of associations 132 and/or display of data which requires the second set of associations 132, but which is not explicitly representative of second set of associations 132.

Still referring to FIG. 1, in some embodiments, second association training data 300 may include first subset of first dataset 112 as inputs correlated to first subset of second dataset as outputs 116, i.e., second association training data 300 may include first set of associations 120.

Still referring to FIG. 1, in some embodiments, generating second set of associations 132 may additionally include training a generative machine learning process using first data set 112, synthesizing, using the generative machine learning, first synthetic data as a function of the first data set, and generating the second set of associations 132 as a function of the first synthetic data and the first set of associations. Generative machine learning process may include any generative machine learning process described in this disclosure, for example with reference to FIG. 2. Synthetic data may include any generated data described in this disclosure, for example with reference to FIG. 2. In some cases, second association training data may include first synthetic data as inputs correlated to a subset of one or more of first or second dataset as outputs.

Still referring to FIG. 1, in some embodiments, one or more of first data set and second data set may include text or textual data. In some cases, generating second set of association 132 may additionally include associating, using a natural language processing model, textual data within one or more of first data set 112 and second data set 116 and generating the second set of associations 132 as a function of the associated textual data. Natural language processing model may include any language processing model or process described in this disclosure, for example with reference to FIG. 2.

Still referring to FIG. 1, in some embodiments, generating second set of association 132 may additionally include calculating distance between data elements within one or more of first data set 112 and second data set 116 and generating the second set of associations 132 as a function of the distances between the data elements. Distance may include any distance described in this disclosure, for example vector distance, including disclosure in FIG. 2.

Still referring to FIG. 1, in some embodiments, one or more of first data set 112 and second data set 116 includes metadata and generating second set of association 132 may additionally include associating metadata within one or more of the first data set and the second dataset and generating the second set of associations 132 as a function of the associated metadata. Metadata may include any metadata or contextual data described in this disclosure, for example with reference to FIG. 2.

Figure 2:
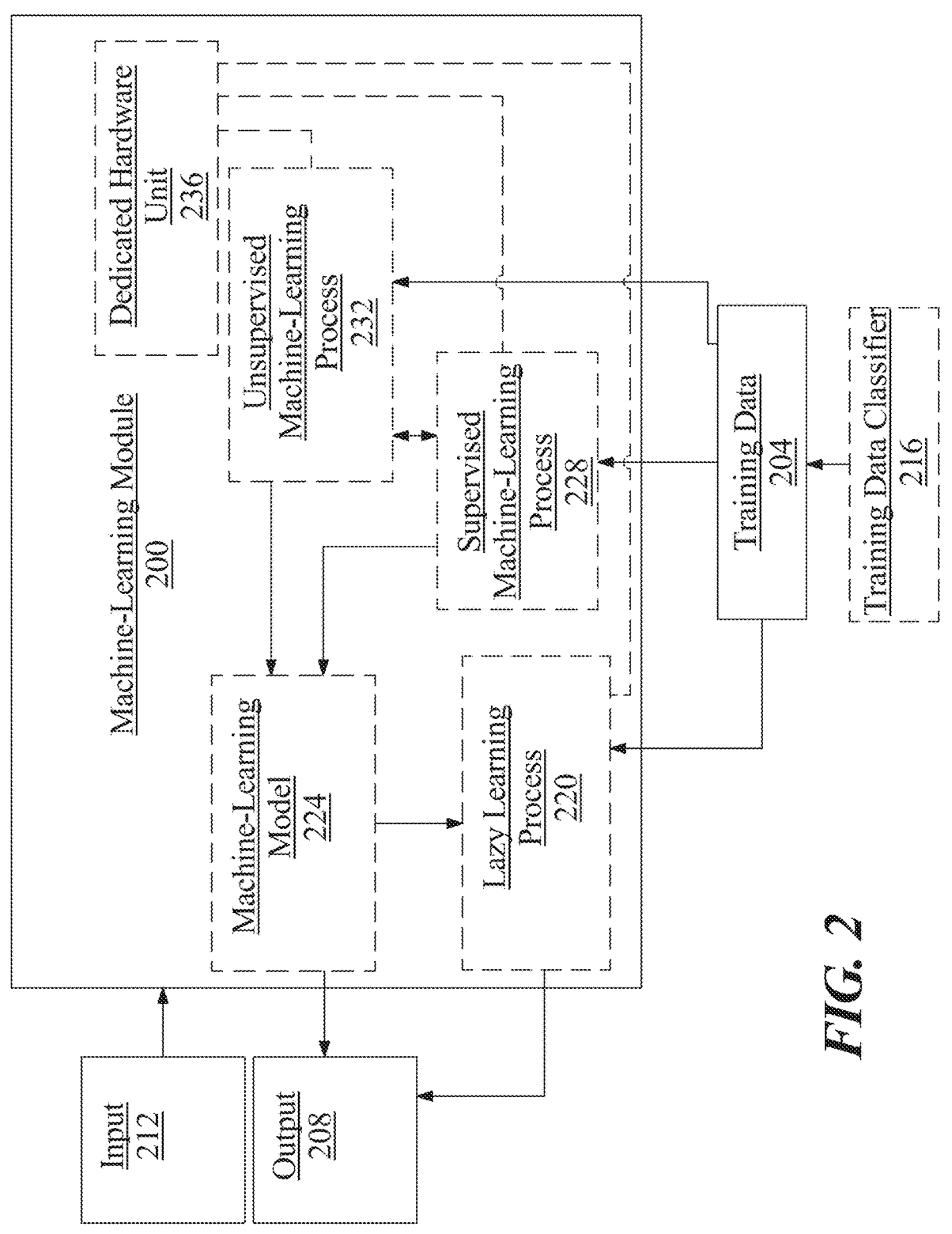
FIG. 2 is a block diagram of an exemplary machine-learning process.

Still referring to FIG. 2, in some embodiments, one or more of first dataset 112 and second dataset 116 may include image data and generating second set of associations 132 may include identifying, using a machine vision system, one or more visual features within one or more of the first dataset and the second dataset.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example a first set of associations 120, direct correlations, examples of a second set of associations 132, or any data mentioned in the entirety of this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to a first set of associations 120.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include a first set of associations 120 as described above as inputs, a second set of associations 120 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

With continued reference to FIG. 2, machine learning process may include a generative machine learning process. As used in this disclosure, a "generative machine learning process" is a process that automatedly, using a prompt (i.e., input), generates an output consistent with training data; this is in contrast to a non-machine learning software program where outputs are determined in advance by a user and written in a programming language. Usually generative machine learning processes determine patterns and structures from training data and use these patterns and structures to synthesize new data with similar characteristics, as a function of an input.

With continued reference to FIG. 2, generative machine learning processes may synthesize data of different types or domains, including without limitation text, code, images, molecules, audio (e.g., music), video, and robot actions (e.g., electromechanical system actions). Exemplary generative machine learning systems trained on words or word tokens, operant in text domain, include GPT-3, LaMDA, LLaMA, BLOOM, GPT-4, and the like. Exemplary machine learning processes trained on programming language text (i.e., code) include without limitation OpenAI Codex. Exemplary machine learning processes trained on sets of images (for instance with text captions) include Imagen, DALL-E, Midjourney, Adobe Firefly, Stable Diffusion, and the like; image generative machine learning processes, in some cases, may be trained for text-to-image generation and/or neural style transfer. Exemplary generative machine learning processes trained on molecular data include, without limitation, AlphaFold, which may be used for protein structure prediction and drug discovery. Generative machine learning processes trained on audio training data include MusicLM which may be trained on audio waveforms of music correlated with text annotations; music generative machine learning processes, in some cases, may generate new musical samples based on text descriptions. Exemplary generative machine learning processes trained on video include without limitation RunwayML and Make-A-Video by Meta Platforms. Finally, exemplary generative machine learning processes trained using robotic action data include without limitation UniPi from Google Research.

With continued reference to FIG. 2, in some cases a generative machine learning process may include a generative adversarial network. As used in this disclosure, a "generative adversarial network (GAN)" is a machine learning process that includes at least two adverse networks configured to synthesize data according to prescribed rules (e.g., rules of a game). In some cases, a generative adversarial network may include a generative and a discriminative network, where the generative network generates candidate data and the discriminative network evaluates the candidate data. An exemplary GAN may be described according to a following game: Each probability space $(\Omega, \mu_{ref})$ defines a GAN game. There are two adverse networks: a generator network and a discriminator network. Generator network strategy set is $P(\Omega)$, the set of all probability measures $\mu_G$ on $\Omega$. Discriminator network strategy set is the set of Markov kernels $\mu_D: \Omega \rightarrow P[0,1]$, where $P[0,1]$ is set of probability measures on $[0,1]$. GAN game may be a zero-sum game, with objective function $$L(\mu_G,\mu_D)=\mathbb{E}_{x \sim \mu_{ref};y \sim \mu_D(x)}[\ln y]+\mathbb{E}_{x \sim \mu_G;y \sim \mu_D(x)}[\ln(1-y)]$$

Generally, generator network may aim to minimize objective, and discriminator network may aim to maximize the objective. Specifically, generator network seeks to approach $\mu_G \approx \mu_{ref}$, said another way, generator network produces candidate data that matches its own output distribution as closely as possible to a reference distribution (provided with training data). Discriminator network outputs a value close to 1 when candidate data appears to be from reference (training data) distribution, and to output a value close to 0 when candidate data looks like it came from generator network distribution. Generally speaking, generative network generates candidates while discriminative network evaluates them, with contest operating in terms of data distributions. In some embodiments, generator network may learn to map from a latent space to a data distribution of interest, while discriminator network may distinguish candidates produced by the generator network from a true data distribution (e.g., training data). In some cases, generator network's training objective is to increase an error rate of discriminator network (i.e., "fool" the discriminator network by producing novel candidates that the discriminator thinks are not synthesized but, instead, are part of training data). In some cases, a known dataset may serve as initial training data for discriminator network. Training may involve presenting discriminator network with samples from training dataset until it achieves acceptable accuracy. In some cases, generator network may be trained on whether the generator network succeeds in fooling discriminator network. A generator network may be seeded with randomized input that is sampled from a predefined latent space (e.g. a multivariate normal distribution). Thereafter, candidates synthesized by generator network may be evaluated by discriminator network. Independent backpropagation procedures may be applied to both networks so that generator network may produce better samples, while discriminator network may become more skilled at flagging synthetic samples. When used for image generation, generator network may be a deconvolutional neural network, and discriminator may be a convolutional neural network.

Still referring to FIG. 2, in some embodiments generative machine learning process may include a generative adversarial network (GAN), such as, without limitation, Cycle-GAN. CycleGAN may use a pair of inter-reliant neural network generators relying on the outputs of each other to be used as inputs. A CycleGAN process enables a forward and backward translation between domains to occur simultaneously. CycleGAN processes may include a set of calculations. CycleGAN may differ from paired training data, wherein paired training data consists of training examples $\{x_i, y_i\}_{i=1}^N$, where the correspondence between $x_i$ and $y_i$ already exists. In unpaired training data, as applied to CycleGAN processes, a source set $\{x_i\}_{i=1}^N$ ($x_i \in X$) and a target set $\{y_j\}_{j=1}^M$ ($y_j \in Y$), with no information provided as to which $x_i$ matches which $y_j$. In the case of unpaired data, starting with a first dataset in domain X and a second dataset in domain Y, a general mapping may be enabled such that $G:X \to Y$, wherein the output $\hat{y}=G(x)$, $x \in X$ and is indistinguishable from dataset $y \in Y$ by an adversary trained to classify $\hat{y}$ apart from y. CycleGAN processes may include a translator operating in a reverse direction from a separate translator which should produce exactly inverse results such that $G:X \to Y$ and $F:Y \to X$, then G and F should be inverses of each other. $D_x$ operates as a distinguisher between datasets $\{x\}$ and translated datasets $\{F(y)\}$. Conversely $D_y$ operates as a discriminator between $\{y\}$ and $\{G(x)\}$. Next adversarial loss is applied to both mapping functions such that:

$$\mathcal{L}_{GAN}(G,D_Y,X,Y)=\mathbb{E}_{y\sim P_{data}(y)}[\log D_y(y)]+\mathbb{E}_{x\sim P_{data}(x)} [\log(1-D_y(G(x)))]$$

This process is repeatable in a reverse direction and incentivized by reducing cycle consistency loss such that:

$$\mathcal{L}_{cyc}(G,F)=\mathbb{E}_{x\sim P_{data}(x)}[\|F(G(x))-x\|_1]+\mathbb{E}_{y\sim P_{data}(y)}[\|G (F(y))-y\|_1].$$

The end result is summarized by:

$$\mathcal{L}(G,F,D_X,D_Y)=\mathcal{L}_{GAN}(G,D_Y,X,Y)+\mathcal{L}_{GAN}(F,D_X,Y, X)+\lambda\mathcal{L}_{cyc}(G,F),$$

where $\lambda$ controls the relative importance of the objectives.

Still referring to FIG. 2, in a separate non-limiting embodiment, generative machine learning model may include diffusion process and/or diffusion model. An exemplary diffusion model may include an energy-guided stochastic differential equation (EGSDE) process. EGSDE relies on a score-based diffusion model to translate data from one domain to another. Contrary to the CycleGAN process explained above, EGSDE's use score-based diffusion models (SBDMs) to perturb an initial dataset to a Gaussian noise then reverse the process to transform the noise back to the data distribution. This diffusion model adopts a pretrained energy function based on data from the initial source domain and data from the final target domain to guide the inference process of a pretrained stochastic differential equation (SDE). As used herein, "energy function" is defined as a formulaic approximation of a transfer function to convert data from a first dataset from a source domain to usable data within a target domain (e.g., domain of a second dataset). Energy function is composed of two terms. First guiding term is a realistic expert, which prioritizes energy function's focus on discarding source domain-specific features. Second guiding term is a faithful expert, which prioritizes energy function's focus on preserving domain-independent features. Combination of these two functions results in a target domain data set agnostic of source domain data protocols, but which retains substantive features the data manifested. In combination with the pretrained energy function, EGSDE methods employ three experts (energy function, realistic expert, faithful expert) to all contribute to generating best fit output data. A mathematical explanation of this process is described in detail for time-series data. Let $q(y_0)$ be the unknown data distribution on $\mathbb{R}^D$. The forward diffusion process $\{y_t\}_{t\in[0,T]}$, indexed by time t, can then be represented by the following forward $$dy=f(y,t)dt+g(t)dw,$$

where $w \in \mathbb{R}^D$ may be a standard Wiener process, $f(\bullet,t): \mathbb{R}^D \to \mathbb{R}^D$ is the drift coefficient and $g(t) \in \mathbb{R}$ is the diffusion coefficient. As used herein, a "Wiener process" is a filter used in signal processing such that an estimate of a target domain may be produced using linear time-invariant filtering of a noisy process, by assuming known stationary signal. This process may replace the use of a Wiener process with an adaptive filter, least mean squared, frequency domain adaptive filter, or any other applicable filter. As used herein, an "adaptive filter" is a system with a linear filter having a transfer function controlled by variable parameters and a means to adjust those parameters according to an optimization algorithm. The f(y, t) and g(t) is related into the noise size and determines the perturbation kernel $q_{t|0}(y_t|y_0)$ from time 0 to t. If we allow $q_t(y)$ to be the marginal distribution of the SDE at time t, its time reversal can then be described by a separate SDE:

$$dy=[f(y,t)-g(t)^2\nabla_y \log q_t(y)]dt+g(t)d\overline{w},$$

where $\overline{w}$ is a reverse-time standard Wiener process, and dt is an infinitesimal negative timestep. Then a score-based model, s(y,t), may be adopted to approximate the unknown $\nabla_y \log q_t(y)$ by score matching, and thereby inducing a SBDM, which is defined by an SDE:

$$dy=[f(y,t)-g(t)^2s(y,t)]dt+g(t)d\overline{w}.$$

This may then be discretized using a Euler-Maruyama solver. By formally adopting a step size of h, the iteration rule from s to t=s−h is:

$$y_t=y_s-[f(y_s,s)-g(s)^2s(y_s,s)]h+g(s)\sqrt{h}z,z\sim\mathcal{N}(0,I).$$

Still referring to FIG. 2, and still in reference to the use of EGSDE, a set of unpaired images from the source domain $\chi \subset \mathbb{R}^D$ and the target domain $Y \subset \mathbb{R}^D$ as the training data, the goal is to transfer the original time series data from the source domain to the target domain. This goal is accomplished by designing a distribution $p(y_0|x_0)$ on the target domain Y conditioned on a time series $x_0\varepsilon\chi$ to transfer. The translated time series data should be realistic for the target domain by changing the domain-specific features and faithful for the source time series by preserving the domain-independent features. An iterative latent variable refinement (ILVR) may then use a diffusion model on the target domain for realism. An ILVR starts from $y_T \sim \mathcal{N}(0, I)$ and samples from the diffusion model, described immediately above, for $y_T$. To promote faithfulness, $y_T$ may be further refined by adding a residual between the sample $y_T$ and the perturbed source image $x_T$ through a non-trainable low-pass filter:

$$y_T\leftarrow y_T+\phi(x_t)-\phi(y_t),x_t\sim q_{t|0}(x_t|x_0),$$

where $\phi(\bullet)$ is a low-pass filter and $q_{t|0}(\bullet|\bullet)$ is the perturbation kernel determined by the forward SDE. To most accurately employ the pre-trained energy functions across both domains, a valid conditional distribution $p(y_0|x_0)$ is defined by compositing a pretrained SDE and a pretrained energy function under mild regularity conditions as follows:

$$dy=[f(y,t)-g(t)^2(s(y,t)-\nabla_y\varepsilon(y,x_0,t))]dt+g(t)d\overline{w},$$

where $\overline{w}$ is a reverse-time standard Wiener process, dt is an infinitesimal negative timestep such that $s(\bullet|\bullet):\mathbb{R}\times\mathbb{R}\to\mathbb{R}^D$ is the score-based model in the pretrained SDE and $\varepsilon(\bullet,\bullet,\bullet): \mathbb{R}^D\times\mathbb{R}^D\times\mathbb{R}\to\mathbb{R}$ is the energy function. From there, a start point, $y_m$, is sampled from the perturbation distribution $q_{M|0}(y_M|x_0)$, where user may set M=0.5T. Transferred time series data is obtained by taking samples at endpoint t=0 following the SDE.

Still referring to FIG. 2, and still in reference to the use of EGSDE, the energy function is derived by balancing the need to retain domain-independent features of initial time series data 108, while appropriately altering the domain-specific features. Based on this balance, the energy function is the sum of two log potential functions:

$$\varepsilon(y,x,t)=\lambda_s \varepsilon_s(y,x,t)+\lambda_i \varepsilon_i(y,x,t)=\lambda_s \mathbb{E}_{q_{t|0}(x_t|x)} S_S(y,x_p,t)-\lambda_i$$

$$\mathbb{E}_{q_{t|0}(x_t|x)} S_i(y,x_p,t),$$

where $\varepsilon_i(\bullet,\bullet,\bullet): \mathbb{R}^D \times \mathbb{R}^D \times \mathbb{R} \to \mathbb{R}$ and $\varepsilon_s(\bullet,\bullet,\bullet): \mathbb{R}^D \times \mathbb{R}^D \times \mathbb{R} \to \mathbb{R}$ are the log potential functions, $x_t$ is the perturbed source image in the forward SDE, $q_{t|0}(\bullet|\bullet)$ is the perturbation kernel from time 0 to time t in the forward SDE, $S_S(\bullet,\bullet,\bullet): \mathbb{R}^D \times \mathbb{R}^D \times \mathbb{R} \to \mathbb{R}$ and $S_i(\bullet,\bullet,\bullet): \mathbb{R}^D \times \mathbb{R}^D \times \mathbb{R} \to \mathbb{R}$ are functions measuring similarity between the source time series and the perturbed time series, and $\lambda_s \in \mathbb{R}_{>0}$ are weighting hyper-parameters. To specify $S_S(\bullet,\bullet,\bullet)$, a time-dependent domain-specific feature extractor $E_S(\bullet,\bullet): \mathbb{R}^D \times \mathbb{R} \to \mathbb{R}^{C \times H \times W}$, where C, H, and Ware specific feature descriptors of the output. $E_s(\bullet,\bullet)$ is the all but last layer of a classifier trained on both domains to predict whether a time series is from the source domain or the target domain. $S_S(\bullet,\bullet,\bullet)$ is defined as the cosine similarity between features extracted from generated example 116 and initial time series data 108 as follows:

$$S_S(y, x_t, t) = \frac{1}{HW} \sum_{h,w} \frac{E_s^{hw}(x_t, t)^\top E_s^{hw}(y, t)}{\left\| E_s^{hw}(x_t, t) \right\|_2 \left\| E_s^{hw}(y, t) \right\|_2},$$

where $E_s^{hw}(\bullet,\bullet) \in \mathbb{R}^C$ denotes specific source features. $S_i(\bullet, \bullet, \bullet)$ is specified by introducing a domain-independent feature extractor, $E_i(\bullet,\bullet): \mathbb{R}^D \times \mathbb{R} \to \mathbb{R}^D$, which operates as a low-pass filter preserving domain-independent features and discarding domain-specific features. $S_i(\bullet,\bullet,\bullet)$ is further defined as the negative squared $L_2$ distance between features extracted from generated example 116 and initial time series data 108 as follows:

$$S_i(y,x_p,t)=\|E_i(y,t)-E_i(x_p,t)\|_2^2.$$

A more sophisticated $E_i$, beyond simply operating as a low-pass filter, may be employed to disentangle learning methods of the separate domains.

Still referring to FIG. 2, and still in reference to the use of EGSDE, solving the energy-guided reverse-time SDE may be accomplished using the pretrained score-based model s(y,t) and energy function, $\varepsilon(y,x,t)$, to create generated example 116 from conditional distribution $p(y_0|x_0)$. A fair comparison may be achieved using numerical solvers to approximate trajectories from SDEs. As a non-limiting embodiment, a Euler-Maruyama solver is used herein adopting a step size, h, where the iteration rule from s to t=s−h is:

$$y_t = y_s - [f(y,s) - g(s)^2(s(y_s,s) - \nabla_y \varepsilon(y_s,x_0,s))]h + g(s)\sqrt{h}z, z \sim$$
$$\mathcal{N}(0,I).$$

The Monte Carlo method is used to estimate the expectation of a single sample for efficiency. In a non-limiting embodiment, the variance preserve energy-guided SDE may be used to modify the noise prediction network and take it into the sampling procedure in denoising diffusion probabilistic models.

Still referring to FIG. 2, and still in reference to the use of EGSDE, a product of experts is used for the discretized sampling process. A conditional distribution at time, t, is defined:

$$\tilde{p}(y_t|x_0) = \frac{p_{r1}(y_t|x_0)p_e(y_t|x_0)}{Z_t},$$

where $Z_t$ is the partition function, $p_e(y_t|x_0) \propto \exp(-\varepsilon(y_t,x_0,t))$ and $p_{r1}(y_t|x_0)$ is the marginal distribution at time t, based on a pretrained SDE on the target domain. A transition kernel, $\tilde{p}(y_t|y_s)$, is constructed based on the desirable equilibrium, $\tilde{p}(y_t|x_0)=\int \tilde{p}(y_t|y_s)\tilde{p}(y_s|x_0)dy_s$, where t=s−h:

$$\tilde{p}(y_t | y_s) = \frac{p(y_t | y_s)p_e(y_t | x_0)}{\tilde{Z}_t(y_s)},$$

where $\tilde{Z}_t(y_s)$ is the partition function and $p(y_t|y_s)= \mathcal{N}(\mu(y_s, h), \Sigma(s,h)I)$ is the transition kernel of the pretrained SDE. Using a Taylor expansion around $\mu(y_s, h)$ to approximate low curvature values of $\varepsilon(y_t, x_0, t)$, the following is obtained:

$$p(y_t|y_s) \approx \mathcal{N} \ (\mu(y_s,h) - \Sigma(s,h)\nabla_y \varepsilon(y',x_0,t)|_{y'=\mu(y_0,h)}, \Sigma(s,h)$$
$$I).$$

Solving the energy-guided SDE in a discretization manner is approximated by sampling from a product of experts as described at the beginning of this paragraph. The conditional distribution, initially defined in the beginning of this paragraph, can now be rewritten as:

$$\tilde{p}(y_t | x_0) = \frac{p_{r1}(y_t | x_0)p_{r2}(y_t | x_0)p_f(y_t | x_0)}{Z_t},$$

where $p_{r2}(y_t|x_0) \propto \exp(-\lambda_s \varepsilon_s(y_t, x_0, t))$, $p_f(y_t|x_0) \propto \exp(-\lambda_i \varepsilon_i (y_t,x_0,t))$. With t=0, transferred samples approximately follow the distribution defined by the product of three experts, where $p_{r1}(y_t|x_0)$ and $p_{r2}(y_t|x_0)$ operate as the realism experts and $p_f(y_t|x_0)$ is the faithful expert, corresponding to the score function s(y,t) and the log potential functions $\varepsilon_s(y, x, t)$ and $\varepsilon_i(y, x, t)$, respectively.

Further referring to FIG. 2, one or more processes or algorithms described above may be performed by at least a dedicated hardware unit 232. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 232 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 232 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 232 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
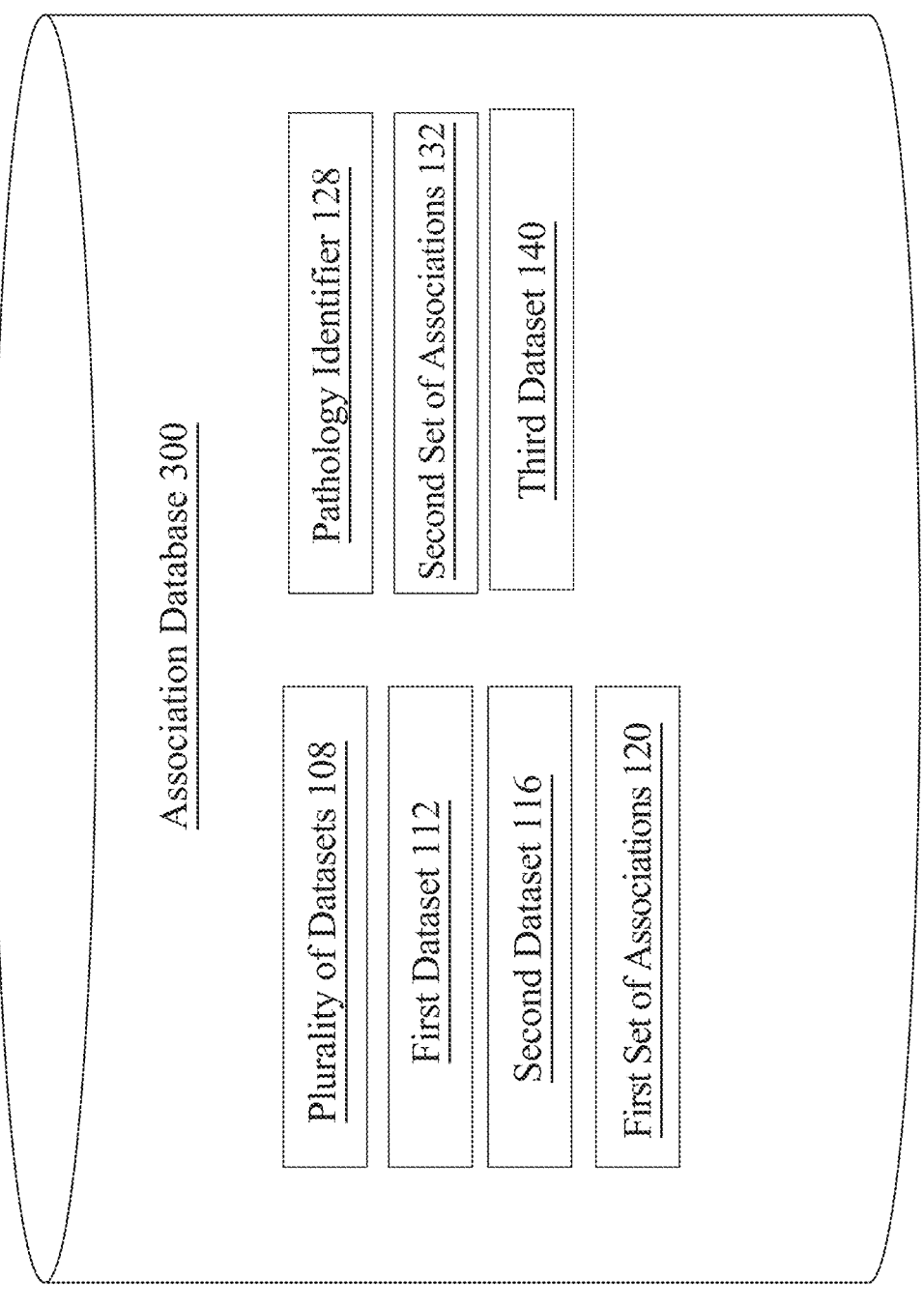
FIG. 3 is a block diagram of an exemplary embodiment of an association database.

Now referring to FIG. 3, an exemplary association database 300 is illustrated by way of block diagram. In an embodiment, any past or present versions of any data disclosed herein may be stored within the association database 300 including but not limited to: plurality of datasets 108, first dataset 112, second dataset 116, a first set of associations 120, visual features, named entities, pathology identifiers, a second set of associations 132, third dataset 140, and the like. Processor 104 may be communicatively connected with association database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network. Association database 300 may be implemented, without limitation, as a relational database, a key-value retrieval database such as a NOSQL database, or any other format or structure for use as a database that a person skilled in the art would recognize as suitable upon review of the entirety of this disclosure. Association database 300 may alternatively or additionally be implemented using a distributed data storage protocol and/or data structure, such as a distributed hash table or the like. Association database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
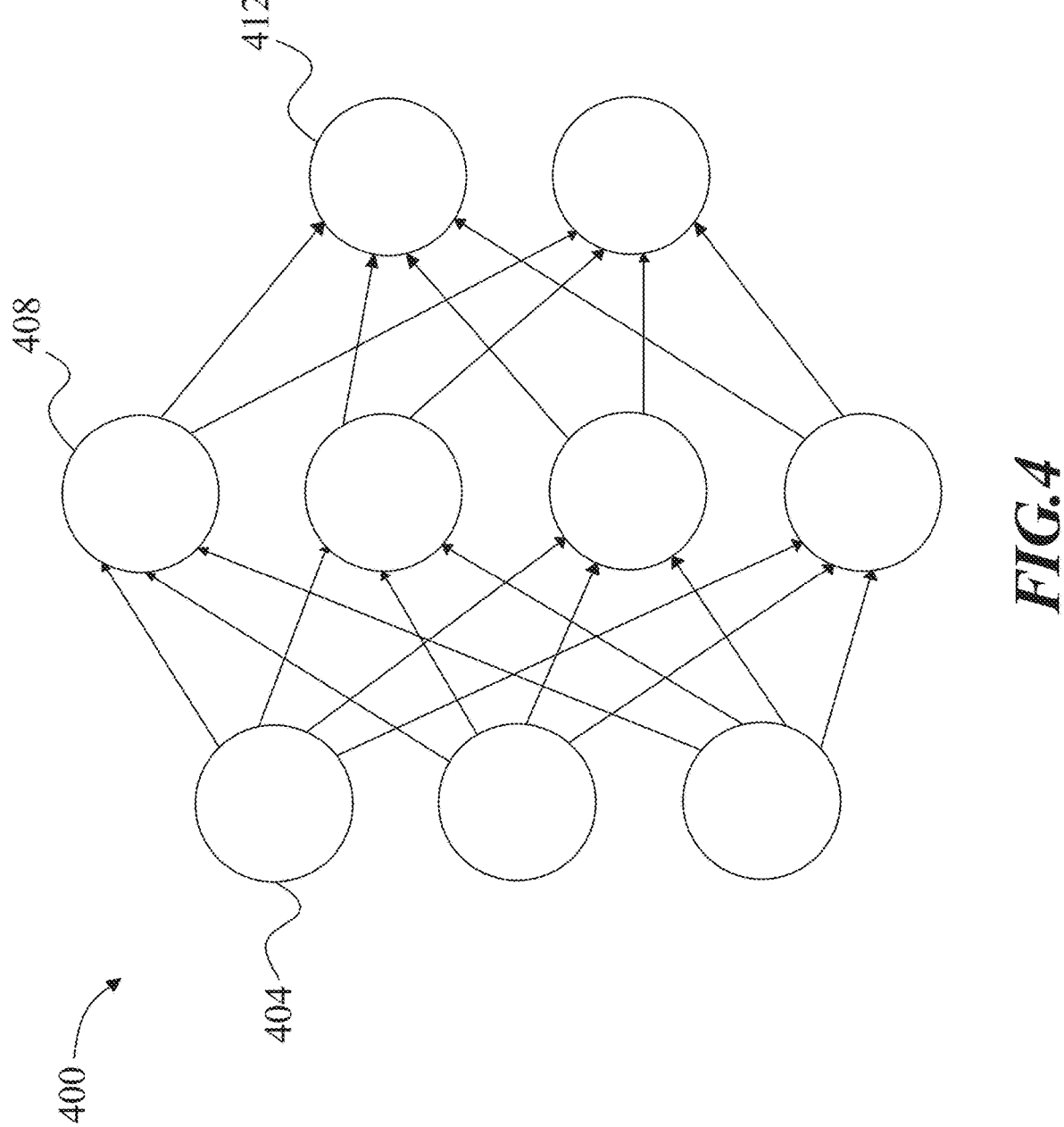
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
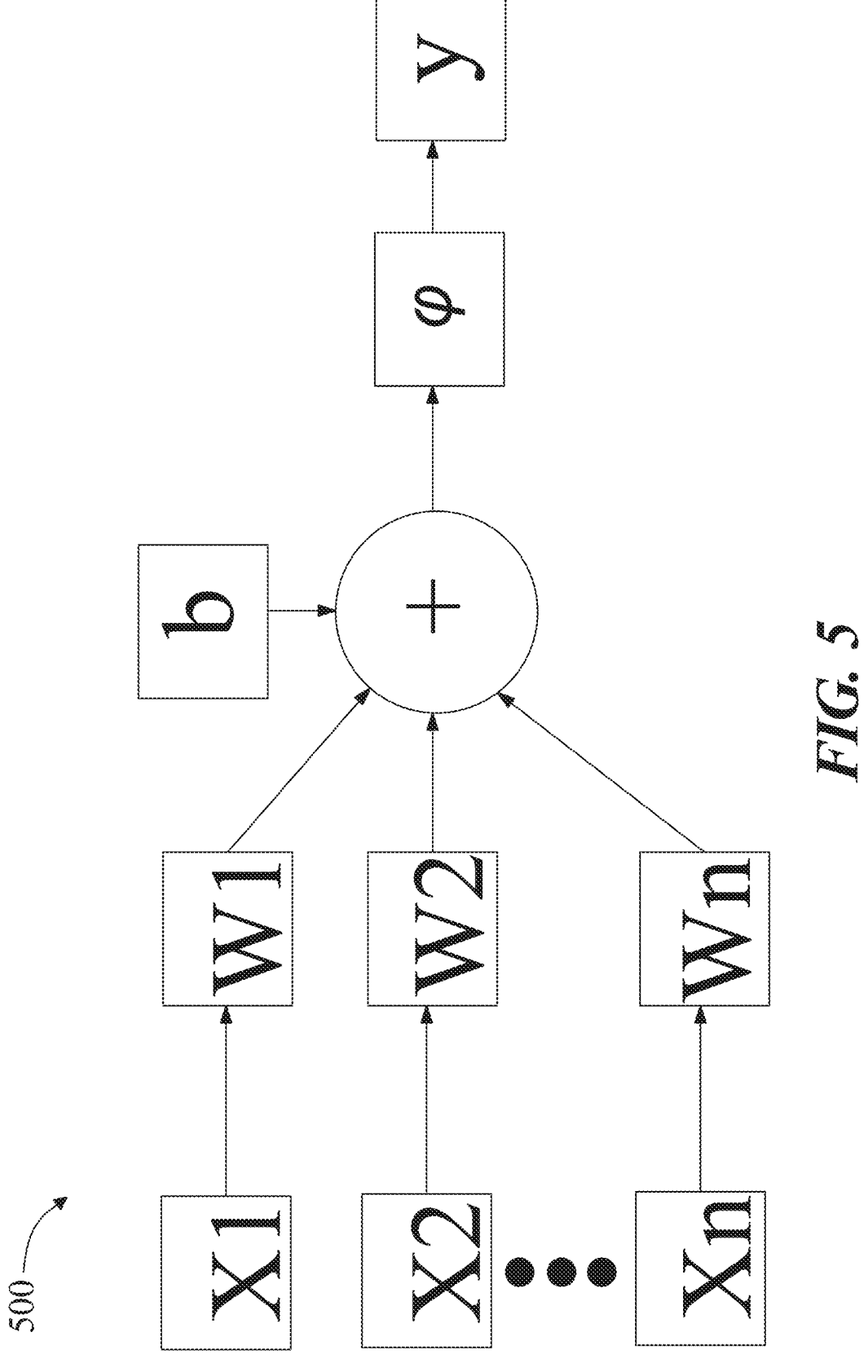
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w may be determined by training a neural network using training data, which may be performed using any suitable process as described above.

Figure 6:
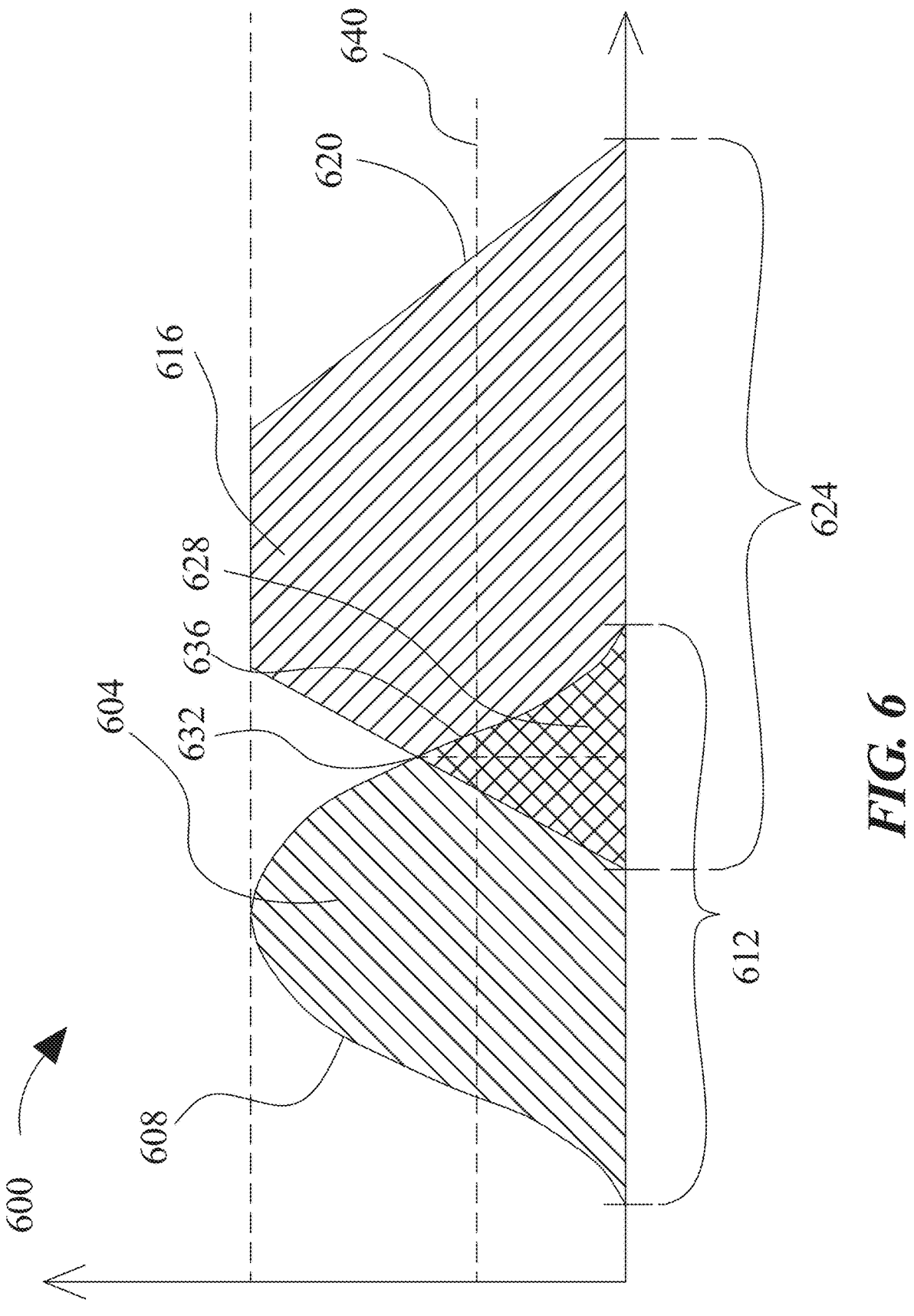
FIG. 6 is an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent a visual features and named entities from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input a plurality of scanned user labels 120 and a plurality of named entities. For instance, an acceptance variable may represent a first measurable value pertaining to the classification of a plurality of visual features to an named entities. Continuing the example, an output variable may represent a second set of associations 132. In an embodiment, a plurality of visual features and/or an named entities may be represented by their own fuzzy set. In other embodiments, an evaluation factor may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T (c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$
(x, a, b, c) = \begin{cases} 0, & \text{for } x > c \text{ and } x < a \\ \dfrac{x-a}{b-a}, & \text{for } a \le x < b \\ \dfrac{c-x}{c-b}, & \text{if } b < x \le c \end{cases}
$$

a trapezoidal membership function may be defined as:

$$
y(x, a, b, c, d) = \max\left(\min\left(\frac{x-a}{b-a}, 1, \frac{d-x}{d-c}\right), 0\right)
$$

a sigmoidal function may be defined as:

$$
y(x, a, c) = \frac{1}{1 - e^{-a(x-c)}}
$$

a Gaussian membership function may be defined as:

$$
y(x, c, \sigma) = e^{-\frac{1}{2}\left(\frac{x-c}{\sigma}\right)^2}
$$

and a bell membership function may be defined as:

$$
y(x, a, b, c,) = \left[1 + \left|\frac{x-c}{a}\right|^{2b}\right]^{-1}
$$

Persons skilled in the art, upon reviewing the entirety of this disclosure, will be aware of various alternative or additional membership functions that may be used consistently with this disclosure.

First fuzzy set 604 may represent any value or combination of values as described above, including any a plurality of visual features, and named entities. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, second set of associations 132 may indicate a sufficient degree of overlap with fuzzy set representing a plurality of visual features and an named entities for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both a plurality of visual features and a named entities have fuzzy sets, second set of associations 132 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
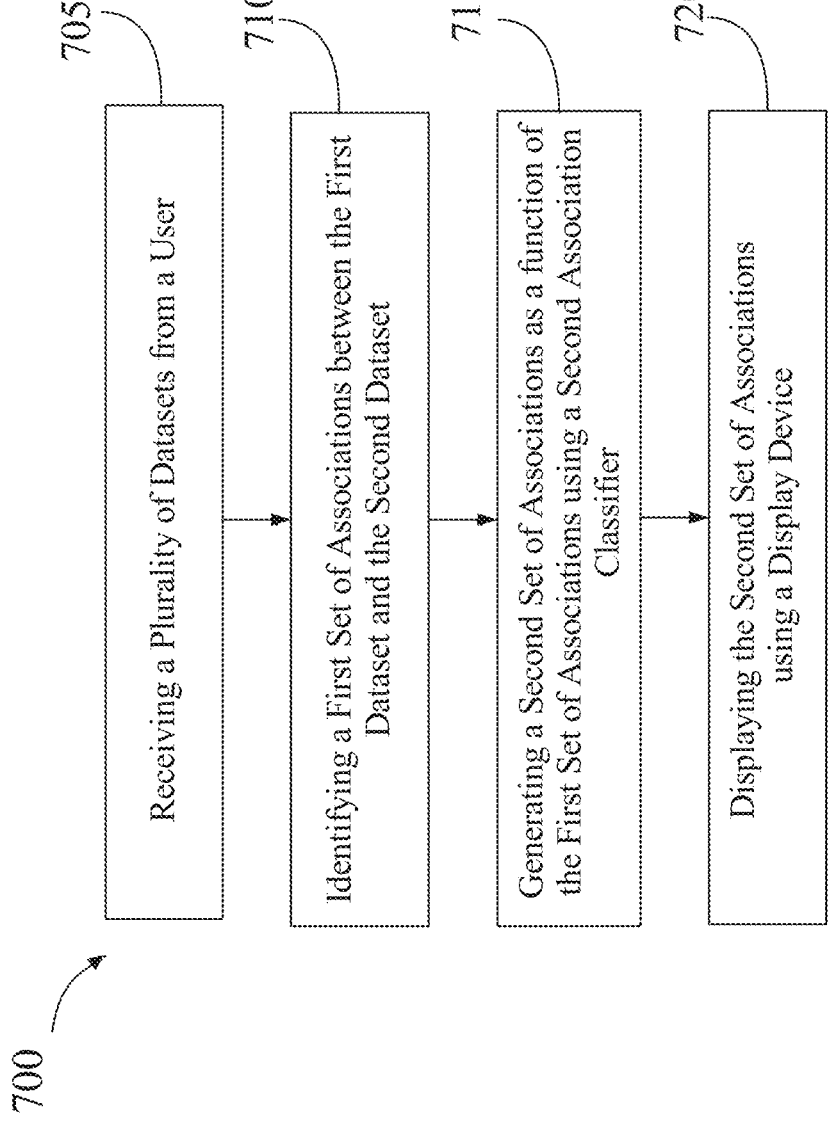
FIG. 7 is a flow diagram of an exemplary method for detecting associations among datasets of different types.

Referring now to FIG. 7, a flow diagram of an exemplary method 800 for detecting associations among datasets of different types is illustrated. At step 705, method 700 includes receiving, using at least a processor, a plurality of datasets from a user. The plurality of datasets include a first dataset including a plurality of textual data and a second dataset including a plurality of image data. This may be implemented as described and with reference to FIGS. 1-6. In an embodiment, the plurality of datasets includes a plurality of data associated with one or more prognostic slides.

Still referring to FIG. 7, At step 710, method 700 includes identifying, using the at least a processor, a first set of associations between the first dataset and the second dataset. This may be implemented as described and with reference to FIGS. 1-6. In an embodiment, first set of associations includes a plurality of direct correlations between the plurality of datasets. In another embodiment, the first set of associations includes a plurality of pathology identifiers. Generating the first set of associations may include identifying, using the at least a processor, one or more visual features within the second dataset. Generating the first set of associations may include generating, using the at least a processor, a plurality named entities associated with the first dataset. Generating the first set of associations may additionally include generating, using the at least a processor, a plurality named entities associated with the first dataset.

Still referring to FIG. 7 At step 715, method 700 includes generating, using the at least a processor, at a second set of associations as a function of the first set of associations using a second association classifier. Generating a second set of associations includes training the second association classifier using a using second association training data, wherein second association training data comprises a plurality of data entries containing the first set of associations as inputs correlated to the second set of associations as outputs and generating the second set of associations as a function of the first set of associations a trained second association classifier. In some versions, second association training data may include first subset of first dataset as inputs correlated to first subset of second dataset as outputs. This may be implemented as described and with reference to FIGS. 1-6. In an embodiment, the second set of associations includes a plurality of abstract correlations between the plurality of datasets. In another embodiment, the method further includes generating, using the at least a processor, a third dataset as a function of the second set of associations. In some cases, the method includes generating, using the at least a processor, the second set of associations using a fuzzy inference set.

Still referring to FIG. 7 At step 720, method 700 includes displaying the second set of associations using a display device. This may be implemented as described and with reference to FIGS. 1-6.

Still referring to FIG. 7, in some embodiments, generating second set of associations, at step 715, additionally includes training a generative machine learning process using first data set, synthesizing, using the generative machine learning, first synthetic data as a function of the first data set, and generating the second set of associations as a function of the first synthetic data and the first set of associations. Generative machine learning process may include any generative machine learning process described in this disclosure, including with reference to FIGS. 1-6 above. First synthetic data may include any data generated by a machine learning process, such as a generative machine learning process, described in this disclosure, including with reference to FIGS. 1-6 above. In some cases, second association training data may include first synthetic data as inputs correlated to first subset of second dataset as outputs.

Still referring to FIG. 7, in some embodiments, first data set includes text. Text may include any text or textual data described in this disclosure, for example with reference to FIGS. 1-6. In some cases, generating second set of association, at step 715, may additionally include associating, using a natural language processing model, textual data within first data set and generating the second set of associations as a function of the associated textual data within the first data set and the first set of associations.

Still referring to FIG. 7, in some embodiments, generating second set of association, at step 715, may additionally include calculating distance between data elements within first data set and generating the second set of associations as a function of the distances between data elements within the first data set and first set of associations. Distance may include any distance, such as vector distance, described in this disclosure, for example with reference to FIGS. 1-6.

Still referring to FIG. 7, in some embodiments, first data set may include metadata. Metadata may include any metadata or contextual data described in this disclosure, for example with reference to FIGS. 1-6. In some cases, generating second set of association, at step 715, may additionally include associating metadata within first data set and generating the second set of associations as a function of the associated metadata within the first data set and first set of associations.

Still referring to FIG. 7, in some embodiments, second dataset may include image data. Image data may include any representative data, such as graphics, described in this disclosure, for example with reference to FIGS. 1-6. In some cases, generating second set of associations, at step 715, may include identifying, using a machine vision system, one or more visual features within second dataset. Machine vision system may include any machine vision system described in this disclosure, for example with reference to FIGS. 1-6. Visual features may include any visual features described in this disclosure, for example with reference to FIGS. 1-6.

Still referring to FIG. 7, in some embodiments, generating first set of associations, at step 710, may include identifying a plurality of named entities in first dataset, wherein each named entity of plurality of named entities is associated with at least a data element in second dataset.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
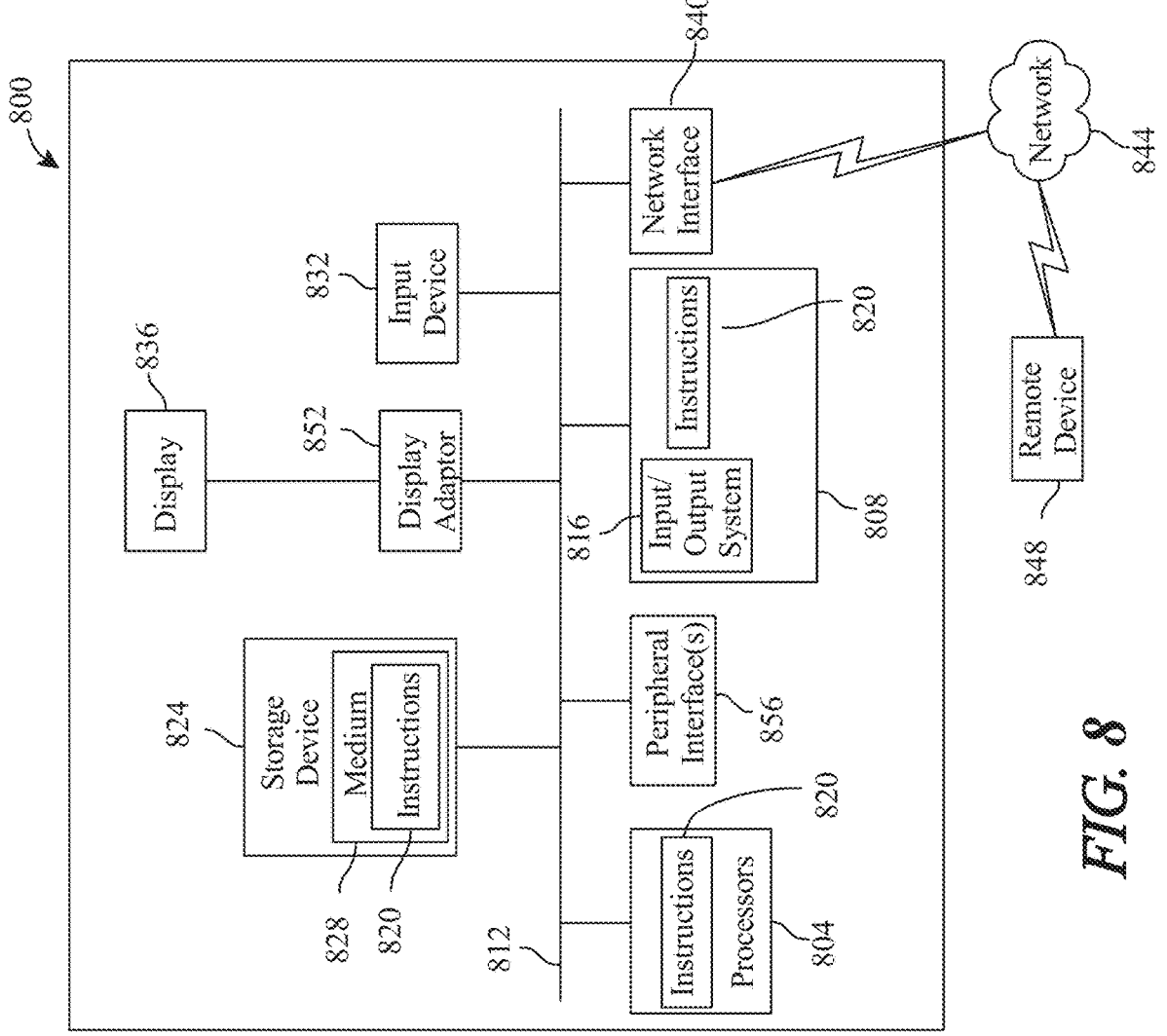
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824)

include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for detecting associations among datasets of different types, wherein the apparatus comprises:

at least a processor; and a memory communicatively connected to the at least a processor, wherein the memory containing instructions configuring the at least a processor to:

receive a plurality of datasets, wherein the plurality of datasets comprises a first dataset and a second dataset;

identify a first set of associations between a first subset of the first dataset and a first subset of the second dataset, wherein the first set of associations comprises at least one pathology identifier comprising a unique identification code or label that is assigned to both image data and textual data associated with a pathology slide;

generate a second set of associations between a second subset of the first dataset and a second subset of the second dataset, as a function of the first set of associations using a second association classifier, wherein generating the second set of associations comprises:

training the second association classifier using second association training data, wherein the second association training data comprises a plurality of data entries containing the first set of associations; and generating the second set of associations as a function of the first set of associations using the trained second association classifier; and display the second set of associations using a display device.

2. The apparatus of claim 1, wherein the second association training data comprises the first subset of the first dataset as inputs correlated to the first subset of the second dataset as outputs.

3. The apparatus of claim 1, wherein generating the second set of associations further comprises:

training a generative machine learning process using the first data set;

synthesizing, using the generative machine learning, first synthetic data as a function of the first data set; and generating the second set of associations as a function of the first synthetic data and the first set of associations.

4. The apparatus of claim 3, wherein the second association training data comprises the first synthetic data as inputs correlated to the first subset of the second dataset as outputs.

5. The apparatus of claim 1, wherein the first data set includes text and generating the second set of association further comprises:

associating, using a natural language processing model, textual data within the first data set; and generating the second set of associations as a function of the associated textual data within the first data set and the first set of associations.

6. The apparatus of claim 1, wherein generating the second set of association further comprises:

calculating distance between data elements within the first data set; and generating the second set of associations as a function of the distances between data elements within the first data set and the first associations.

7. The apparatus of claim 1, wherein the first data set includes metadata and generating the second set of association further comprises:

associating metadata within the first data set; and generating the second set of associations as a function of the associated metadata within the first data set and the first associations.

8. The apparatus of claim 1, wherein the second dataset includes image data and generating the second set of associations comprises identifying, using a machine vision system, one or more visual features within the second dataset.

9. The apparatus of claim 1, wherein generating the first set of associations comprises identifying a plurality of named entities in first dataset, wherein each named entity of plurality of named entities is associated with at least a data element in second dataset.

10. A method for detecting associations among datasets of different types, wherein the method comprises:

receiving, using at least a processor, a plurality of datasets, wherein the plurality of datasets comprises a first dataset and a second dataset:

identifying, using the at least a processor, a first set of associations between a first subset of the first dataset and a first subset of the second dataset, wherein the first set of associations comprises at least one pathology identifier comprising a unique identification code or label that is assigned to both image data and textual data associated with a pathology slide;

generating, using the at least a processor, at a second set of associations between a second subset of the first dataset and a second subset of the second dataset, as a function of the first set of associations using a second association classifier, wherein generating the second set of associations comprises:

training the second association classifier using a using second association training data, wherein the second association training data comprises a plurality of data entries containing the first set of associations; and generating the second set of associations as a function of the first set of associations using the trained second association classifier; and displaying the second set of associations using a display device.

11. The method of claim 10, wherein the second association training data comprises the first subset of the first dataset as inputs correlated to the first subset of the second dataset as outputs.

12. The method of claim 10, wherein generating the second set of associations further comprises:

training a generative machine learning process using the first data set;

synthesizing, using the generative machine learning, first synthetic data as a function of the first data set; and generating the second set of associations as a function of the first synthetic data and the first set of associations.

13. The method of claim 12, wherein the second association training data comprises the first synthetic data as inputs correlated to the first subset of the second dataset as outputs.

14. The method of claim 10, wherein the first data set includes text and generating the second set of association further comprises:

associating, using a natural language processing model, textual data within the first data set; and generating the second set of associations as a function of the associated textual data within the first data set and the first set of associations.

15. The method of claim 10, wherein generating the second set of association further comprises:

calculating distance between data elements within the first data set; and generating the second set of associations as a function of the distances between data elements within the first data set and the first set of associations.

16. The method of claim 10, wherein the first data set includes metadata and generating the second set of association further comprises:

associating metadata within the first data set; and generating the second set of associations as a function of the associated metadata within the first data set and the first set of associations.

17. The method of claim 10, wherein the second dataset includes image data and generating the second set of associations comprises identifying, using a machine vision system, one or more visual features within the second dataset.

18. The method of claim 10, wherein generating the first set of associations comprises identifying a plurality of named entities in first dataset, wherein each named entity of plurality of named entities is associated with at least a data element in second dataset.

* * * * *